(12) United States Patent
Reitzloff et al.

(10) Patent No.: US 7,527,328 B2
(45) Date of Patent: May 5, 2009

(54) MODULAR ROOF SYSTEM FOR AUTOMOTIVE VEHICLE

(75) Inventors: Cliff R. Reitzloff, Northville, MI (US); Michael J. Urban, Coral Springs, FL (US); Tim Shoskey, Royal Oak, MI (US); Michael Porter, Allen Park, MI (US)

(73) Assignee: Specialty Vehicle Acquisition Corp., Los Angeles, CA (US)

( * ) Notice: Subject to any disclaimer, the term of this patent is extended or adjusted under 35 U.S.C. 154(b) by 3 days.

(21) Appl. No.: 11/805,703

(22) Filed: May 24, 2007

(65) Prior Publication Data

US 2008/0290697 A1 Nov. 27, 2008

(51) Int. Cl.
*B60J 7/06* (2006.01)
(52) U.S. Cl. ...................................... 296/219
(58) Field of Classification Search ................. 296/219
See application file for complete search history.

(56) References Cited

U.S. PATENT DOCUMENTS

| | | | |
|---|---|---|---|
| 1,910,075 A | 5/1933 | Westad |
| 2,042,431 A | 6/1936 | Hooper |
| 2,103,372 A | 12/1937 | Lange |
| 2,580,337 A | 12/1951 | Votypka |
| 2,985,483 A | 5/1961 | Bishop et al. |
| 3,298,731 A | 1/1967 | Sangimino |
| 3,702,430 A | 11/1972 | Knetsch et al. |
| 3,953,067 A | 4/1976 | Isola |
| 3,960,404 A | 6/1976 | Bienert et al. |
| 4,063,774 A | 12/1977 | Hanks |
| 4,085,965 A | 4/1978 | Schlapp et al. |
| 4,143,907 A | 3/1979 | Ireland et al. |
| 4,227,739 A | 10/1980 | Sorensen |
| 4,272,121 A | 6/1981 | Kim |
| 4,329,594 A | 5/1982 | Bohm et al. |
| 4,371,204 A | 2/1983 | George et al. |
| 4,502,726 A | 3/1985 | Adams |
| 4,556,835 A | 12/1985 | Vogel et al. |

(Continued)

FOREIGN PATENT DOCUMENTS

DE 1 288 929 2/1969

(Continued)

OTHER PUBLICATIONS 16 color photographs of the rear roof movement of a 1965 Studebaker Wagonaire, offered for sale and publicly used in 1965.

(Continued)

*Primary Examiner*—Dennis H Pedder
(74) *Attorney, Agent, or Firm*—Harness, Dickey & Pierce, P.L.C.

(57) ABSTRACT

A method of closing a vehicular system having a moveable front bow and a moveable rear bow. The method includes moving the front bow forward, releasing tension from the rear bow, moving the front bow to a closed position, and moving the rear bow to a closed position. In another aspect, a method of minimizing buffeting in a vehicle interior compartment from a sunroof. The method includes moving a first end bow of the sunroof to an open position and moving a second end bow of the sunroof away from a seal.

27 Claims, 25 Drawing Sheets

U.S. PATENT DOCUMENTS

| | | | |
|---|---|---|---|
| 4,561,691 A | 12/1985 | Kawai et al. | |
| 4,629,953 A | 12/1986 | Inoue et al. | |
| 4,630,858 A | 12/1986 | Bez et al. | |
| 4,644,699 A | 2/1987 | Chandler et al. | |
| 4,733,145 A | 3/1988 | Ohashi et al. | |
| 4,811,985 A | 3/1989 | Kruger et al. | |
| 4,835,449 A | 5/1989 | Huehn | |
| 4,910,445 A | 3/1990 | Borrmann et al. | |
| 4,968,090 A | 11/1990 | Schleicher et al. | |
| 4,991,902 A | 2/1991 | Schrader et al. | |
| 5,018,783 A * | 5/1991 | Chamings et al. | 296/219 |
| 5,121,958 A | 6/1992 | Goeden et al. | |
| 5,141,283 A * | 8/1992 | Omoto et al. | 296/219 |
| 5,152,577 A | 10/1992 | Omoto et al. | |
| 5,169,206 A | 12/1992 | Omoto et al. | |
| 5,185,562 A | 2/1993 | Huyer et al. | |
| 5,203,605 A | 4/1993 | Grimm et al. | |
| 5,225,747 A | 7/1993 | Helms et al. | |
| 5,242,210 A | 9/1993 | Fujisawa et al. | |
| 5,250,882 A | 10/1993 | Odoi et al. | |
| 5,310,241 A | 5/1994 | Omoto et al. | |
| 5,451,849 A | 9/1995 | Porter et al. | |
| 5,540,478 A | 7/1996 | Schuch et al. | |
| 5,551,197 A | 9/1996 | Repp et al. | |
| 5,704,173 A | 1/1998 | Repp et al. | |
| 5,734,727 A | 3/1998 | Flaherty et al. | |
| 5,746,475 A | 5/1998 | Caye et al. | |
| 5,825,147 A | 10/1998 | Porter et al. | |
| 5,898,392 A | 4/1999 | Bambini et al. | |
| 5,934,727 A | 8/1999 | Storc et al. | |
| 5,944,378 A | 8/1999 | Mather et al. | |
| 5,951,100 A | 9/1999 | Ewing et al. | |
| 5,961,177 A | 10/1999 | Caye et al. | |
| 6,010,180 A | 1/2000 | Bureau et al. | |
| 6,030,022 A | 2/2000 | Bormann et al. | |
| 6,074,078 A | 6/2000 | Georgeff et al. | |
| 6,114,819 A | 9/2000 | Porter et al. | |
| 6,119,760 A | 9/2000 | Poole | |
| 6,217,096 B1 | 4/2001 | Koiwa et al. | |
| 6,246,199 B1 | 6/2001 | Porter et al. | |
| 6,288,511 B2 | 9/2001 | Porter et al. | |
| 6,305,740 B1 | 10/2001 | Staser et al. | |
| 6,322,137 B1 | 11/2001 | Munsters et al. | |
| 6,325,436 B1 | 12/2001 | Ehrenberger et al. | |
| 6,325,452 B1 | 12/2001 | Johannes Sanders et al. | |
| 6,340,204 B1 | 1/2002 | Seifert et al. | |
| 6,345,859 B1 | 2/2002 | Thomas et al. | |
| 6,398,296 B1 | 6/2002 | Mayer et al. | |
| 6,412,859 B1 | 7/2002 | Wilhelmus Thijssen et al. | |
| 6,416,104 B1 | 7/2002 | Fisher et al. | |
| 6,428,090 B1 | 8/2002 | Reinsch et al. | |
| 6,431,644 B1 | 8/2002 | Nagashima et al. | |
| 6,454,346 B1 | 9/2002 | Nabuurs et al. | |
| 6,478,355 B1 | 11/2002 | Van Eden et al. | |
| 6,478,368 B1 | 11/2002 | de Gaillard et al. | |
| 6,485,094 B2 | 11/2002 | Corder et al. | |
| 6,494,528 B2 | 12/2002 | Tolinski et al. | |
| 6,497,448 B1 | 12/2002 | Curtis et al. | |
| 6,517,135 B2 | 2/2003 | de Gaillard et al. | |
| 6,520,570 B2 | 2/2003 | Schatzler et al. | |
| 6,568,732 B2 | 5/2003 | De Gaillard | |
| 6,604,782 B2 | 8/2003 | De Gaillard et al. | |
| 6,634,699 B2 | 10/2003 | Collins et al. | |
| 6,672,638 B2 | 1/2004 | Corder et al. | |
| 6,676,189 B2 | 1/2004 | Schall et al. | |
| 6,676,192 B2 | 1/2004 | Marold et al. | |
| 6,783,172 B2 | 8/2004 | De Gaillard et al. | |
| 6,860,549 B2 | 3/2005 | Engelgau | |
| 6,866,335 B2 | 3/2005 | Tolinski et al. | |
| 6,899,382 B2 | 5/2005 | Engelgau | |
| 6,926,354 B2 | 8/2005 | Munsters et al. | |
| 7,051,781 B2 | 5/2006 | Grimm et al. | |
| 7,114,769 B2 | 10/2006 | Storc et al. | |
| 7,163,260 B2 | 1/2007 | Reitzloff et al. | |
| 7,399,030 B2 * | 7/2008 | Reitzloff et al. | 296/219 |
| 2002/0089204 A1 | 7/2002 | Fisher et al. | |
| 2003/0085594 A1 | 5/2003 | Engelgau | |
| 2004/0017097 A1 | 1/2004 | Albert et al. | |
| 2004/0051347 A1 | 3/2004 | Manders et al. | |
| 2005/0110304 A1 | 5/2005 | Engelgau | |
| 2005/0134096 A1 | 6/2005 | Fallis et al. | |
| 2005/0280290 A1 | 12/2005 | Urban et al. | |
| 2005/0280293 A1 | 12/2005 | MacNee et al. | |
| 2006/0145518 A1 | 7/2006 | Evans et al. | |

FOREIGN PATENT DOCUMENTS

| | | |
|---|---|---|
| EP | 0376203 | 7/1990 |
| EP | 0466529 | 1/1992 |
| EP | 0774371 | 5/1997 |
| GB | 2077461 | 12/1981 |
| GB | 2184404 | 6/1987 |
| JP | 63-103733 | 5/1988 |
| JP | 3-159818 | 7/1991 |
| JP | 3-197232 | 8/1991 |

OTHER PUBLICATIONS 2 factory photographs of a 1963 Studebaker Wagonaire, published 1963.

1 copy of a blueprint of the roof assembly for the Studebaker Wagonaire, published, offered for sale and/or publicly used about 1963.

2 web pages illustrating a 2004 GMC Envoy XUV with an opened roof, offered for sale in 2004.

Webasto Hollandia 400 brochure, 2 pages, published 2003.

Webasto sliding sunroof and headliner restoration on a 1959 Mercedes-Benz Type 220S Ponton sedan, 16 pages, published Aug. 7, 2002.

Advertisement—View to the Cosmos, ASC Inc., Automotive News, p. 3, Jan. 9, 2006 (1 page).

Advertisement—infiniVu™ Roof Systems, ASC®, Automotive News, pp. 16B-16C, Dec. 18, 2006 (2 pages).

* cited by examiner

MODULAR ROOF SYSTEM FOR AUTOMOTIVE VEHICLE

BACKGROUND

The present disclosure generally relates to automotive vehicles and, more particularly, to a moveable flexible roof for use in an automotive vehicle.

It is known to employ flexible roof covers for automotive vehicles. For example, a flexible roof cover can be retracted by winding it around a spring loaded roller. Such designs are disclosed in U.S. Pat. No. 1,245,278 to Sherman issued Nov. 6, 1917; and U.S. Pat. No. 3,658,378 to Sutren issued Apr. 25, 1972. More recent variations of single and flexible sunroof covers are disclosed in U.S. Pat. No. 5,018,783 to Chamings et al. issued May 28, 1991; and U.S. Pat. No. 7,163,260 Reitzloff et al. issued Jan. 16, 2007. All of these patents are incorporated by reference herein. Many of these flexible roof covers are limited to small vehicles. As the size of the flexible roof increases, problems such as roof chatter and oscillation occur due to aerodynamic effects occurring while a vehicle is traveling at higher rates of speed. Thus, there is a need for a new apparatus and methods for the deployment of flexible roofs in automotive vehicles.

SUMMARY

In accordance with the present invention, an automotive vehicle open air system is provided. Another aspect of the present invention provides modularized pre-assembly and assembly of the open air system. A further aspect of the present invention employs a method of closing a vehicular system having a moveable front bow and a moveable rear bow. In a further aspect of the present invention, the method includes moving the front bow forward, releasing tension from the rear bow, moving the front bow to a closed position, and moving the rear bow to a closed position. Another aspect of the invention employs a method of minimizing buffeting in a vehicle interior compartment from a sunroof. In a further aspect of the present invention, a method includes moving a first end bow of the sunroof to an open position and moving a second end bow of the sunroof away from a seal. Further areas of applicability will become apparent from the description provided herein. It should be understood that the description and specific examples are intended for purposes of illustration only and are not intended to limit the scope of the present disclosure.

DETAILED DESCRIPTION

Figure 1:
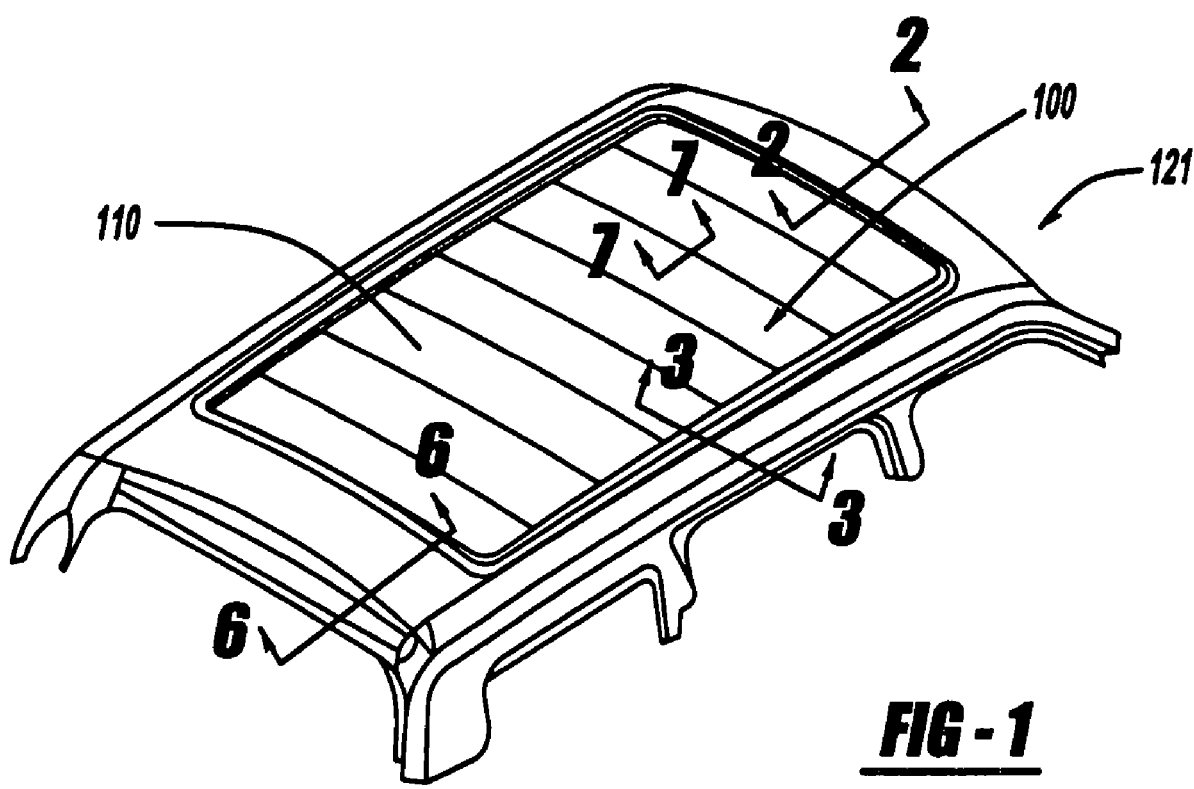
FIG. 1 is a perspective view showing an open air system according to the present disclosure.

The present invention provides a device and methods related to an air system for automotive vehicles. With reference to FIGS. 1-7, a preferred embodiment of an open air system 100 of the present invention includes a movable surface 110, parallel tracks 101 and 102, a drive mechanism to operably move moveable surface 110 along parallel tracks 101 and 102, and an actuator to control the drive mechanism.

Open air system 100 is attached to the vehicle 121 by a front track 190 which may be fastened by an adhesive and fasteners. The fastener may be a plug fastener, a lock type fastener, a screw, a rivet, a weld, or any such known fastener. A front bow 210 includes a top member 211 and the top member 211 includes a connection channel 215. Front bow 210 further includes a bottom member 212 which is fastened to the top member 211.

A cover material 130 of movable surface 110 is a sheet that may made of cloth fabric, a polymeric material, a synthetic blend, and the like. Cover material 130 is mated with an underlayment sheet 136, which are bound together by a binding member 138, such as a sewn seam. The underlayment sheet 136 may be a plastic or polymeric material for improved wear and glide when opening and closing movable surface 110. Underlayment sheet 136 may be chosen so that when it is in contact with a seal 103, the movement of movable surface 110 does not produce wear points in seal 103. Underlayment sheet 136 is attached to a Z-bracket 139 which is secured between top member 211 and bottom member 212 of front bow 210. A headliner 132 may be optionally connected to front bow 210 using a hook-and-loop fastener 135. A vehicle interior trim panel 137 wraps around front track 190. The moveable surface 110 can further include a padding 219. Padding 219 serves to insulate against temperature, mute external noise, and/or for absorbs the impact of outside elements such as rain, sleet and wind. Moveable surface 110 can be in operable contact with the seal 103 with assistance from tension cable 254.

Figure 2:
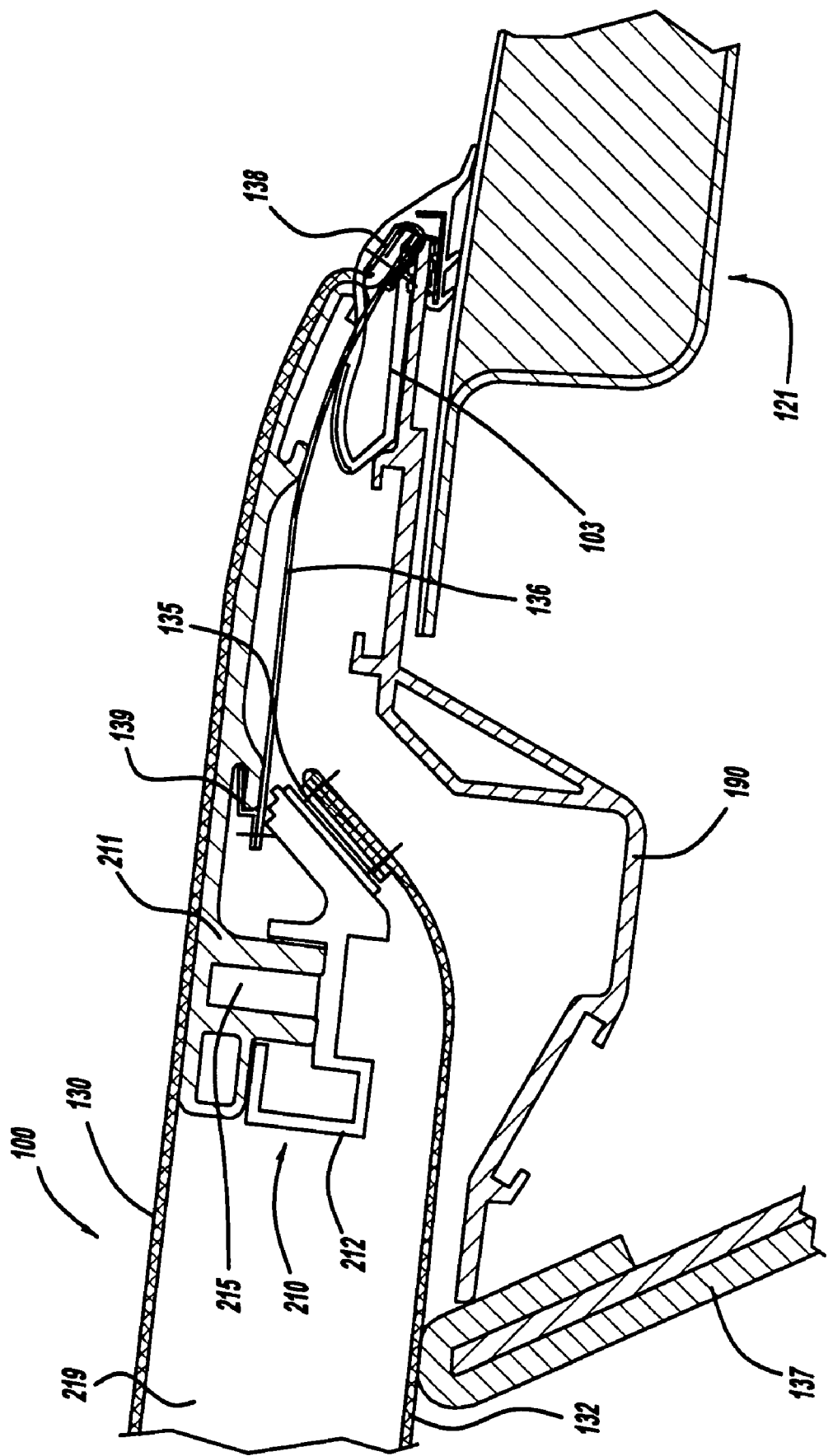
FIG. 2 is a cross-sectional view, taken along line 2-2, of FIG. 1 showing the open air system according to the present disclosure.
Figure 3:
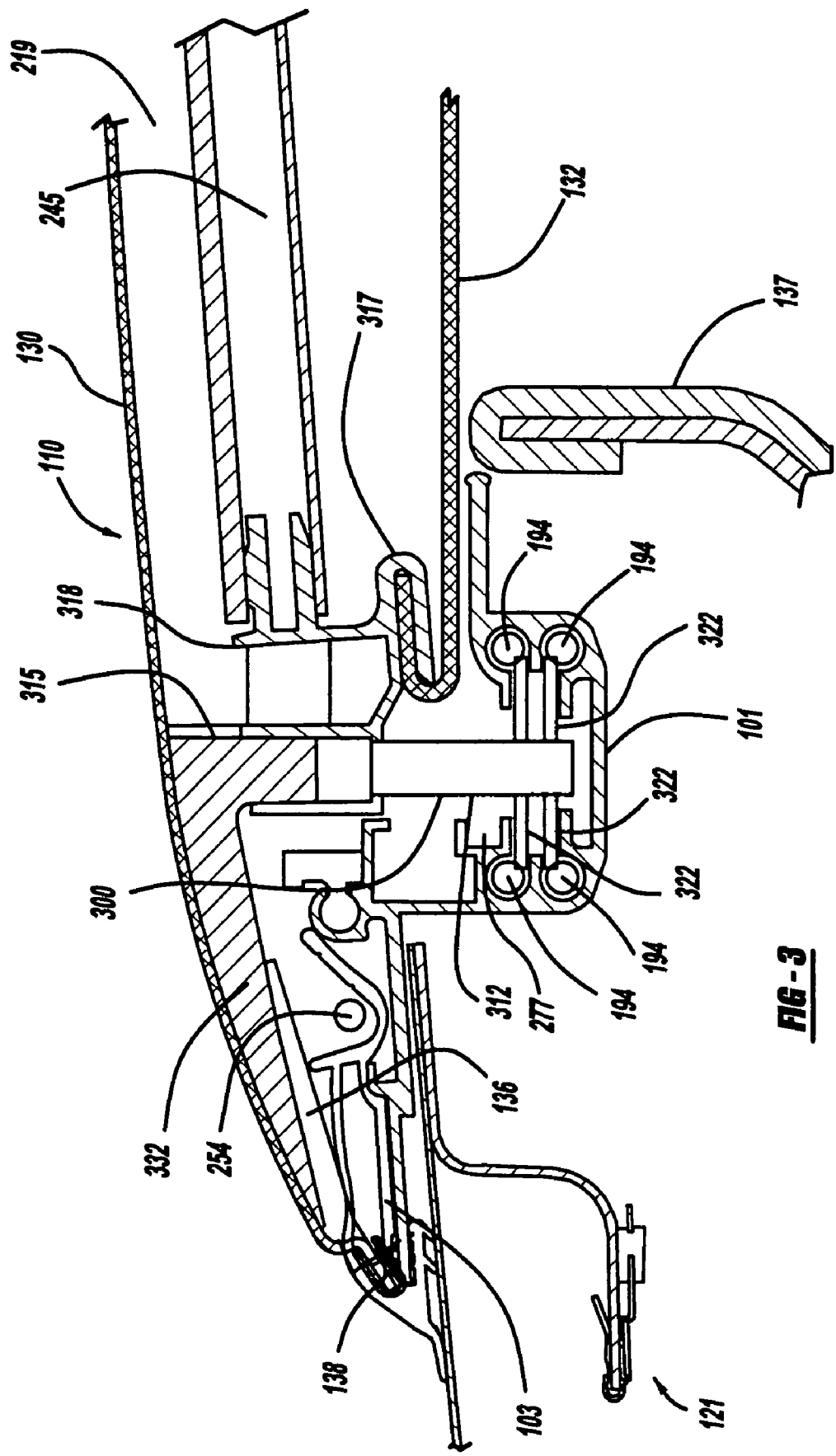
FIG. 3 is a cross-sectional view, taken along line 3-3, of FIG. 1 showing the open air system according to the present disclosure.

Movable surface 110 engages a weatherstrip or seal 103 such that binding member 138 moves seal 103 when the open air system 100 is in a closed position (see FIGS. 2 and 3). This forms a seal that prevents moisture, dirt, and other environmental debris from entering the vehicle 121 when the open air system 100 is closed.

FIG. 3 illustrates moveable surface 110 including a cross bow 245 which spans across a roof opening in vehicle 121 from first track 101 to second track 102. Cross bow 245 is connected to a lift assembly 300 which is mounted in first track 101 while the other side of cross bow 245 is connected to a mirror image of lift assembly 300 which is in second track 102. First track 101 includes a plurality of cable guides 192 and a lift ramp 220. First track 101 further includes a slider channel 277. First track 101 and second track 102 are attached to a stationary roof panel of vehicle 121 using fasteners, adhesive, or combinations of both. Second track 102 is a mirror image of first track 101. Tracks 101, 102 are arranged on the frame rails of vehicle 121 such that first track 101 is substantially parallel to second track 102.

Figure 4:
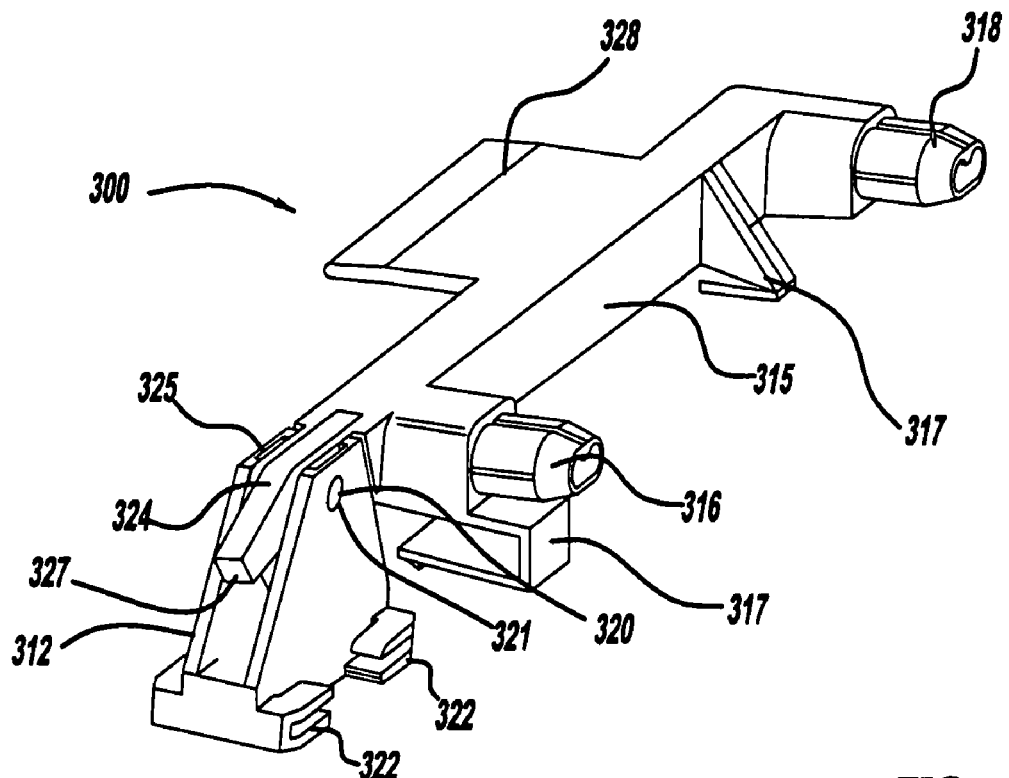
FIG. 4 is a perspective view showing a lift assembly employed in the open air system, according to the present disclosure.
Figure 5:
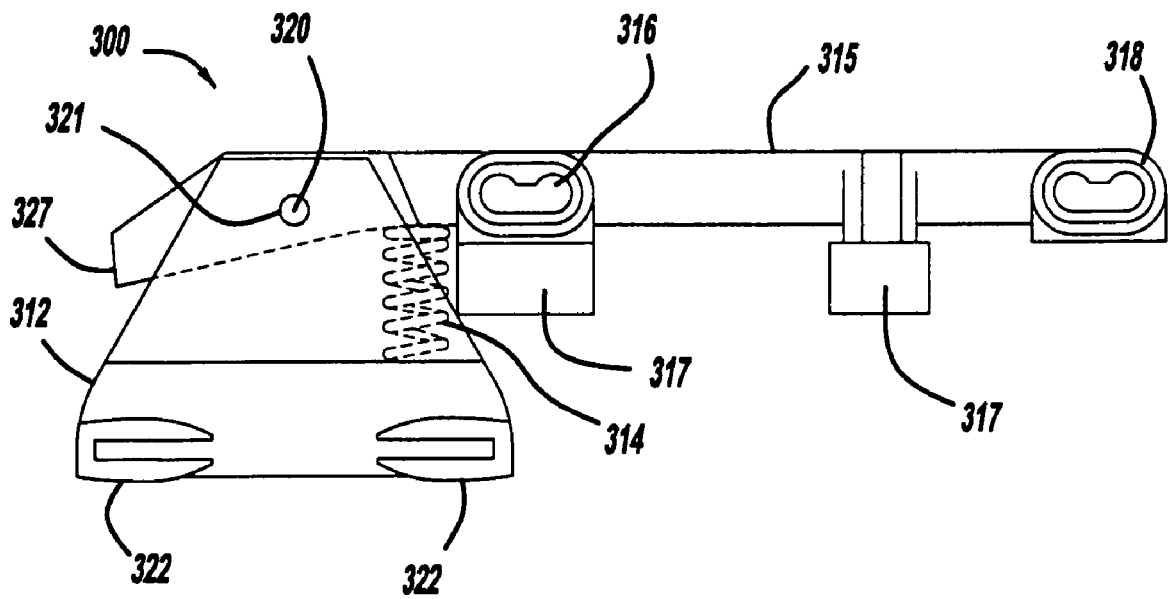
FIG. 5 is a side elevational view showing the lift assembly employed in the open air system, according to the present disclosure.

Lift assembly 300 is illustrated in greater detail in FIGS. 4 and 5. Lift assembly 300 is used in the opening and closing of open air system 100. Lift assembly 300 is advantageous in allowing better vertical in opening moveable surface 110 and an improved neutral position when moveable surface 110 is in a closed position. An improved neutral position seals moveable surface 110 to outside elements and air gusts, and can help prevent buffeting and/or chatter in moveable surface 110 when vehicle 121 is driven at higher speeds. Other advantages include that lift assembly 300 is preferably manufactured using only three parts including a spring 314 which reduces expense and improves reliability. In addition, lift assembly 300 is advantageous in raising moveable surface 110 above tracks 101, 102, thus minimizing wear to seal 103 and moveable surface 110.

Lift assembly 300 includes a slider piece 312 and a lift arm (assembly lift arm) 315. Slider piece 312 is designed so that feet 322 ride in tracks 101, 102. In addition, slider piece 312 has a through hole 321 and recessed areas 328 for making assembly of lift assembly 300 easier.

Lift arm 315 includes two appendages 318 and 316 and a pin 320 which fits into hole 321 during assembly. Pin 320 is the pivot point for operation of lift assembly 300. Lift arm 315 can be shaped to have a cam and/or stops to allow for the best angles of opened and neutral (closed) position. For example, lift arm 315 includes a stopping surface 327 such that when lift arm 315 is in a fully extended open position, lift arm 315 is stopped at its maximum angle so that moveable surface 110 does not fold over on itself, which can minimize breakage of any other lift assembly 300 in the system. Lift arm 315 includes a flag 328 which assists in keeping movable surface 110 operably taut in a closed position. Furthermore, lift assembly 300 can employ a coil compression spring 314 which is attached to lift arm 315 and slider piece 312 between pivot pin 321 and appendage 316.

Lift assembly 300 comprises at least one clip 317 on lift arm 315 which holds headliner 132 (see FIG. 3). Clip 317 keeps headliner 132 above tracks 101, 102 as well as above seal 103 in order to reduce the wear on headliner 132. In addition, this can prevent dirt and grim collected on tracks 101, 102 and seal 103 from being transferred to headliner 132. Lift arm 315 is constructed such that attachment appendages 318 and 316 are above the pivot pin 321 in an open position. This is advantageous since it raises movable surface 110 above tracks 101, 102 such that as moveable surface 110 is opened it does not ride along tracks 101, 102 but rather is raised to avoid wear points in the folds of movable surface 110 when it is being opened and closed or operated in the open position.

Figure 6:
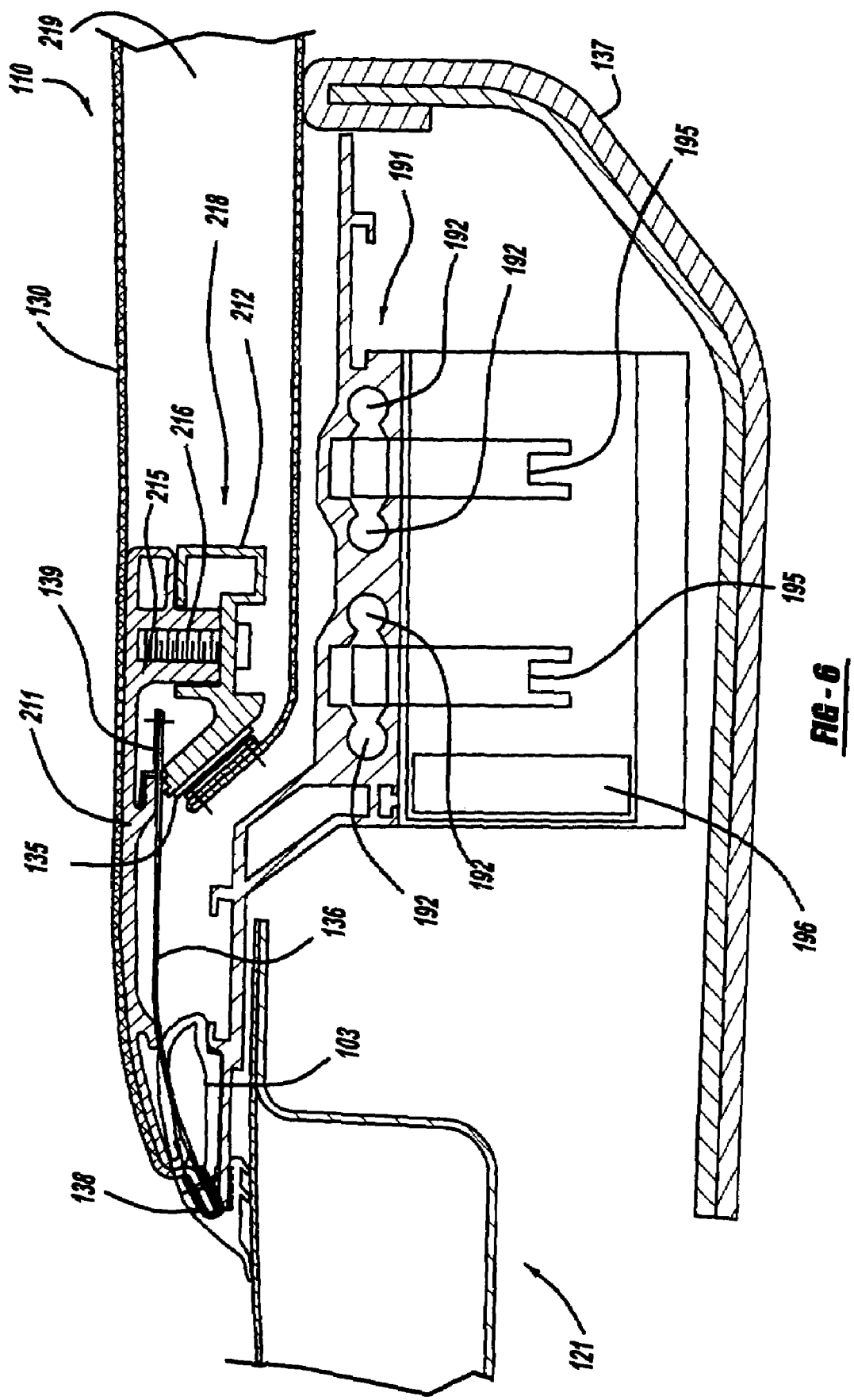
FIG. 6 is a cross-sectional view, taken along line 6-6, of FIG. 1 showing the open air system according to the present disclosure.

With reference to FIG. 6, a cross sectional view of a rear bow 218 is illustrated. Rear bow 218 is an end bow of moveable surface 110 and has a design that is very similar to front bow 210. Both rear bow 218 and front bow 210 comprise a top member 211 which includes a connection channel 215. Top member 211 is connected to a bottom member 212 by a fastener 216. Rear bow 218 is engaged with seal 103 thus deterring outside elements such rain, snow, dirt and the like in the interior of vehicle 121 when moveable surface 110 is closed. Headliner 132 can be optionally connected to rear bow 218 using a hook-and-loop fastener 135. A rear track 191 can be fastened to vehicle 121 using methods described herein and may include a fastener, adhesive, or a combination of both. Rear track 191 includes cable guides 192 such that for drive cables 392 operate along essentially the same plane. Integrated into rear track 191 is at least one electric motor 195 and more preferably two electric motors 195 which drive cables 392. A computer or electronic control unit 196 controls open air system 100. Control unit 196 can be in communication with a controller in a dashboard or a headliner console of vehicle 121, such that a driver or other vehicle occupants can control movement of open air system 100. The control unit 196 can include wires for communication with the body controller or for interfacing with the electrical system of vehicle 121. For example, motors 195 located in the rear of open air system 100. In the case of moveable surface 110 being opened from the front and the rear simultaneously, at least two motors 195 are necessary. Control unit 196 may include express open and express close options and may control prevention of pinching a finger in the closing of movable surface 110. Drive cables 392 are connected to a track glider 294 of a lift mechanism 275 and to motors 195 such that track glider 294 moves based on movement of the motor 195. Motor 195 has a home position and may reset home position when moveable surface 110 is closed. One or more hall effect sensors may be employed for determining the home position. Alternatively, a subassembly integrated into rear track 191 may comprise a movement mechanism for moveable surface 110 along tracks 101, 102. Examples of a movement mechanism may include but are not limited to generally rigid rods, pulley-type cables, Bowden cables, as well as gears of the motor that may directly contact a rack-like track, a jack screw, tape drive or hydraulic mechanism. In the preferred embodiment, a movement mechanism includes two motors 195 and four drive cables 392.

Figure 7:
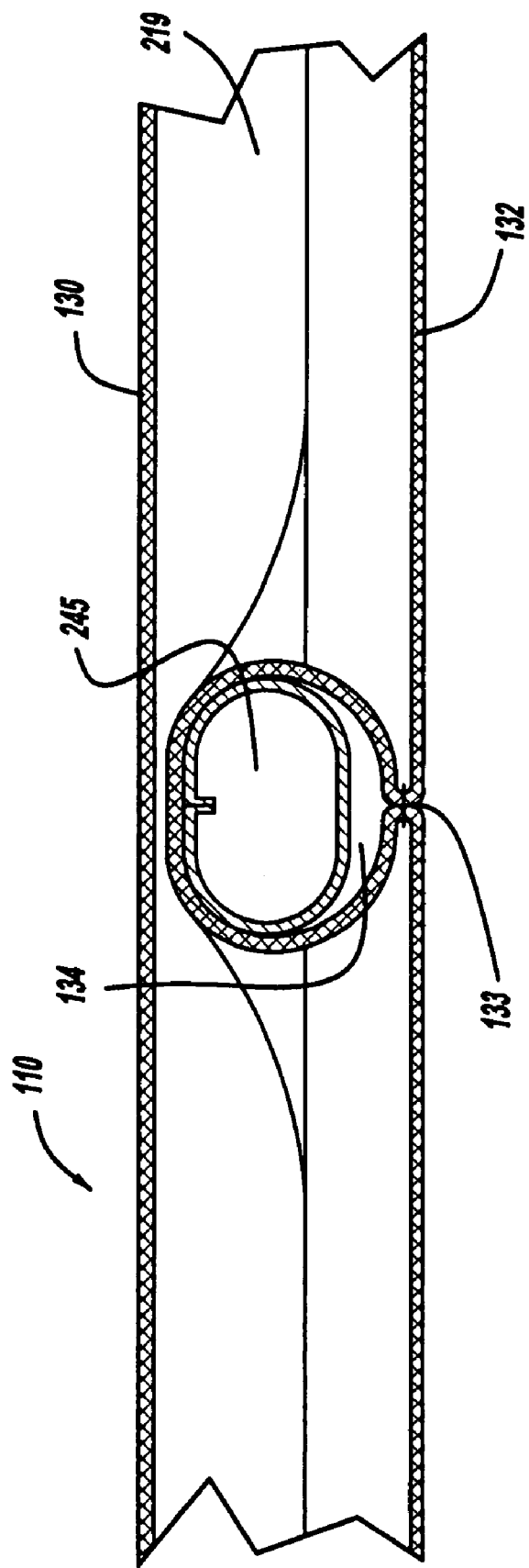
FIG. 7 is a cross-sectional view, taken along line 7-7, of FIG. 1 showing the open air system according to the present disclosure.
Figure 8:
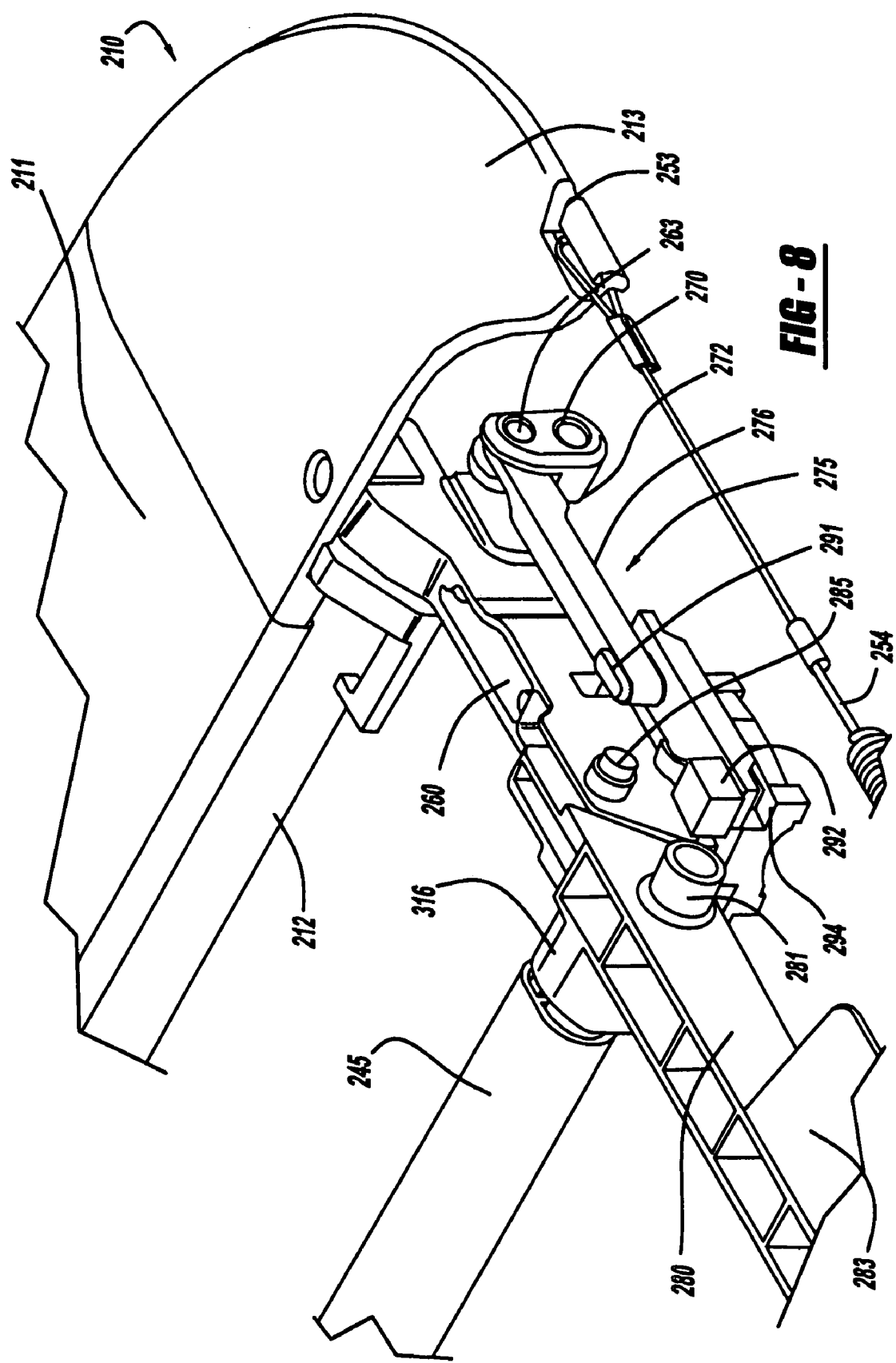
FIG. 8 is a perspective view showing an end bow lift assembly employed in the open air system, according to the present disclosure.
Figure 9:
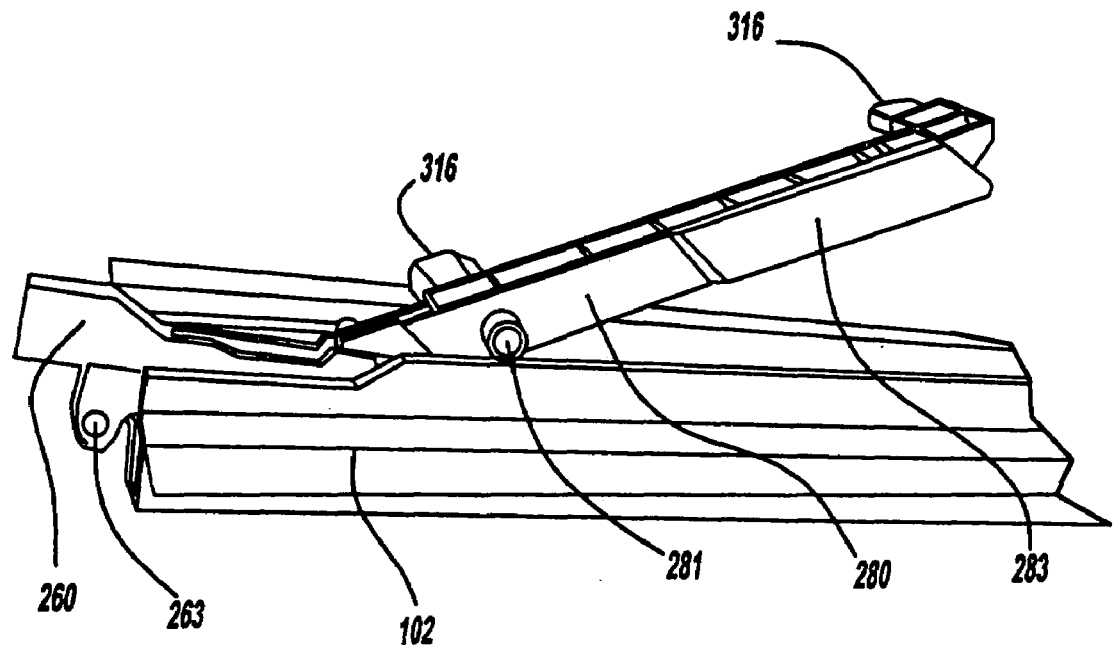
FIG. 9 is a side elevational view showing a first lift arm employed in the open air system, according to the present disclosure.
Figure 10:
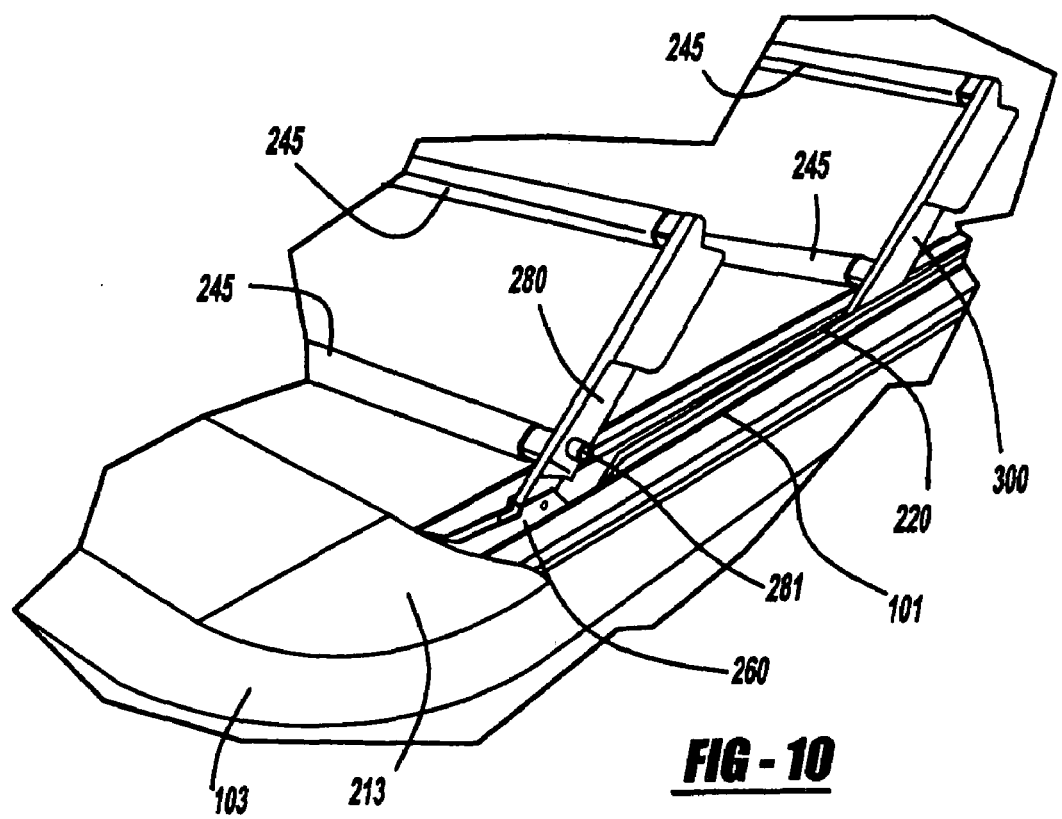
FIG. 10 is a perspective view showing the first lift arm with connected cross bows and the lift assembly with connected cross bows employed in the open air system, according to the present disclosure.

FIG. 7 is a cross sectional view illustrating cross bow 245. Moveable surface 110 includes cross bow 245 which may be fabricated from preferably aluminum or alternatively, plastic, carbon fiber, metal alloys, and the like. Headliner 132 may include a seam 133 that creates a pocket 134 along cross bow 245. Alternatively, headliner 132 may be attached to cross bow 245 using an adhesive with out seam 133 and pocket 134.

With reference to FIGS. 8 and 20-25, a front bow lift mechanism 275 is illustrated. Front bow 210 comprises top member 211, bottom member 212, and a corner piece 213. Front bow 210 is connected to connection member 260. Lift mechanism 275 includes connection member 260, a front lift arm 280, a cam 270, a slider member 276 and a track glider 294. Connection member 260 includes a pin 263 to which cam 270 and a slider member 276 are connected. Slider member 276 includes a polymeric glider element 291. Connection member 260 and slider member 276 are connected to track glider 294. In addition, connection member 260 has a polymeric stop 292.

First front lift arm 280 includes a pair of appendages 316 and 318 for connecting to cross bows 245. The appendages 316, 318 are above pivot point which is at a pin 285 when open air system 100 is in an open position. Front lift arm 280 also includes a flag 283 which assists in keeping moveable surface 110 taunt when open air system 100 is in a closed position. The front lift arm 280 includes a guide 281, which is located on a side opposite of appendages 316, 318. Guide 281 rides along a lift ramp 220 to provide stabilization of moveable surface 110 when in an open position.

A drive cable pulls on lift mechanism 275 which engages a cam guide 272 along a cam ramp 273 thereby lifting front bow 210 above seal 103 so that moveable surface 110 may be moved towards the aft end of vehicle 121. Slider member 276 moves along a slider channel 277 and prevents front bow 210 from being raised too high above seal 103 or from being bent backwards from the wind striking it as the vehicle is in forward movement. As track glider 294 moves along first track 101, front lift arm 280 engages lift ramp 220. Lift ramp 220 assists front lift arm 280 in raising upward and provides a limit as to how far front lift arm 280 may move back. In addition, cam 270 allows lift mechanism 275 to lift front bow 210 up off of seal 103 instead of pulling front bow 210 across seal 103. This lifting of front bow 210 significantly reduces wear on seal and moveable surface 110. It will be apparent that lift mechanism 275 without front lift arm 280 can be employed on rear bow 218.

Figure 11:
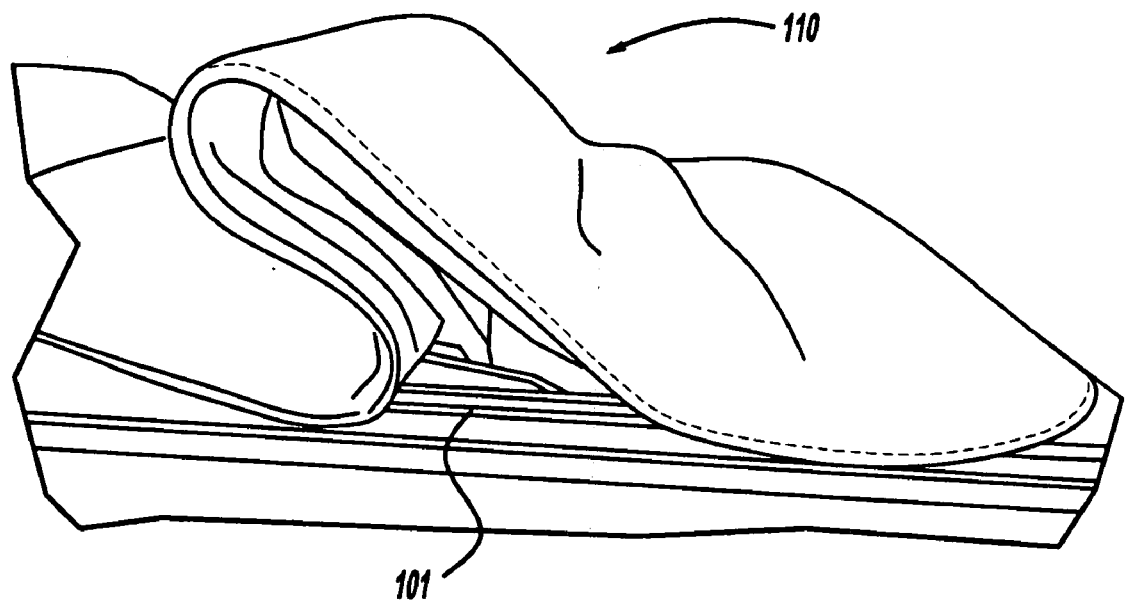
FIG. 11 is a side elevational view showing a flexible roof employed in the open air system positioned as a wind deflector, according to the present disclosure.
Figure 12:
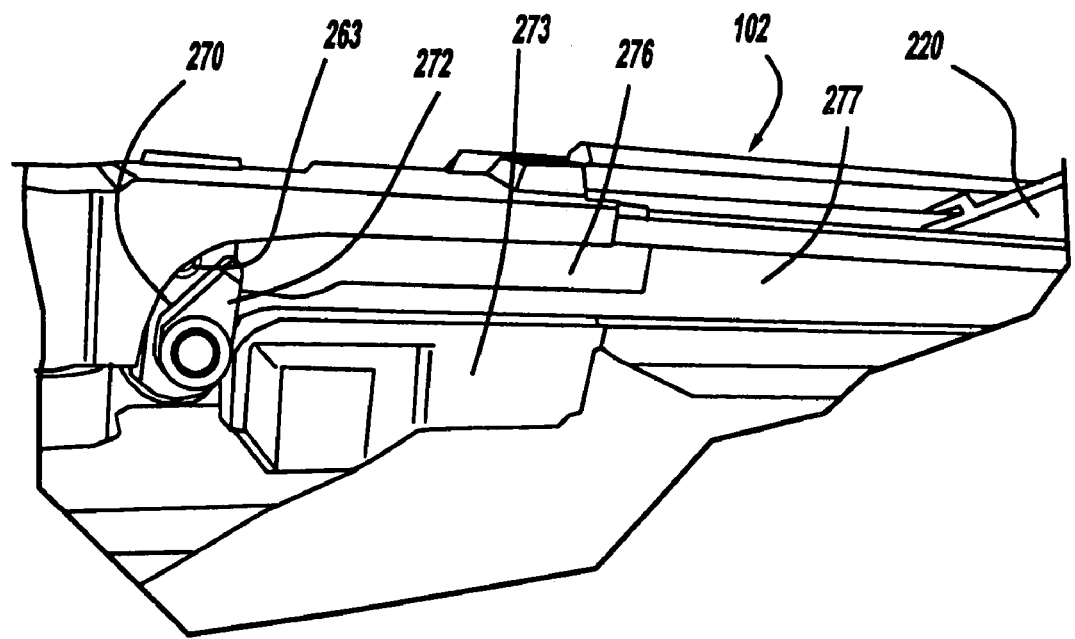
FIG. 12 is a fragmentary side elevational view showing a cam of a end bow lift assembly employed in the open air system, according to the present disclosure.
Figure 13:
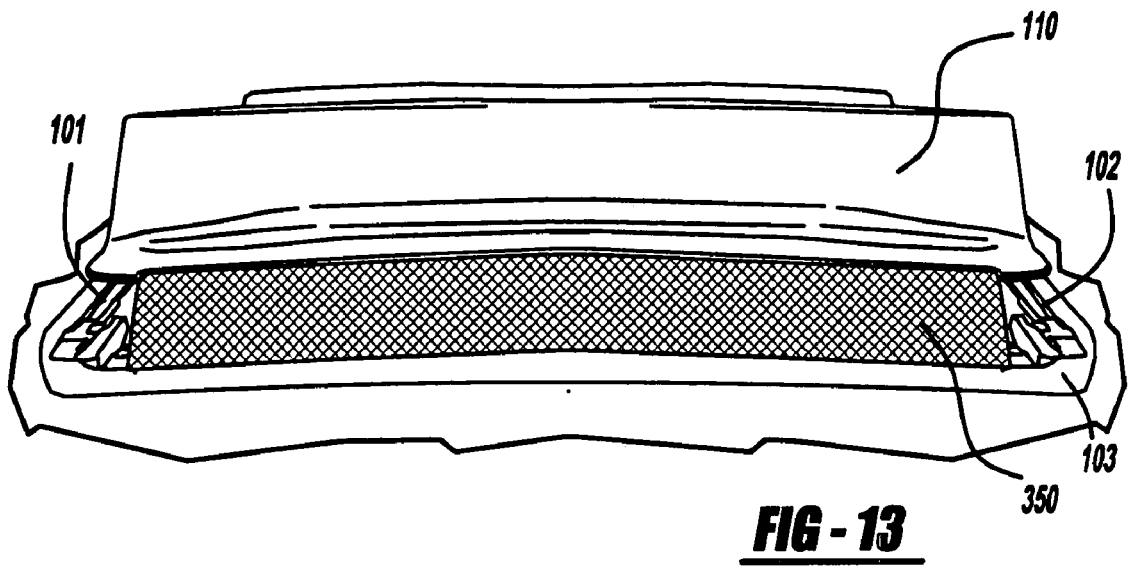
FIG. 13 is a front elevational view showing a flexible roof employed in the open air system positioned as a wind deflector, according to the present disclosure.
Figure 14:
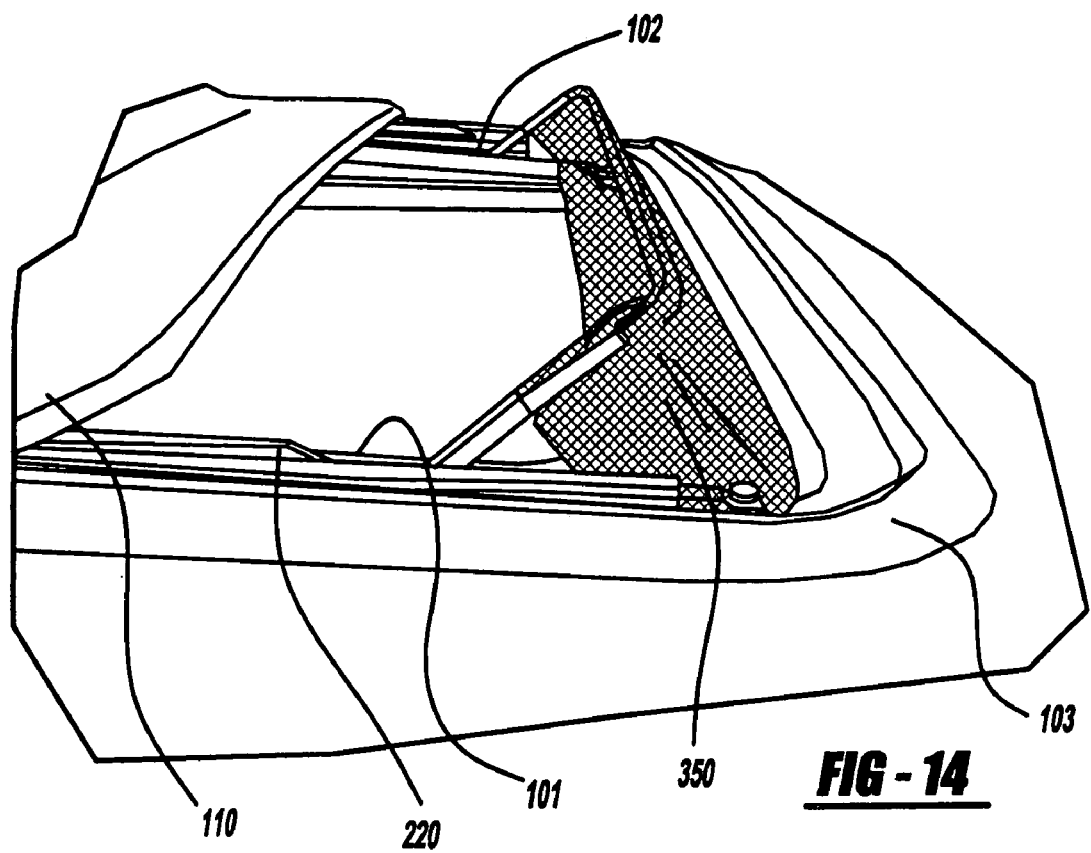
FIG. 14 is a side view showing a forward portion of the open air system, according to the present disclosure.
Figure 15:
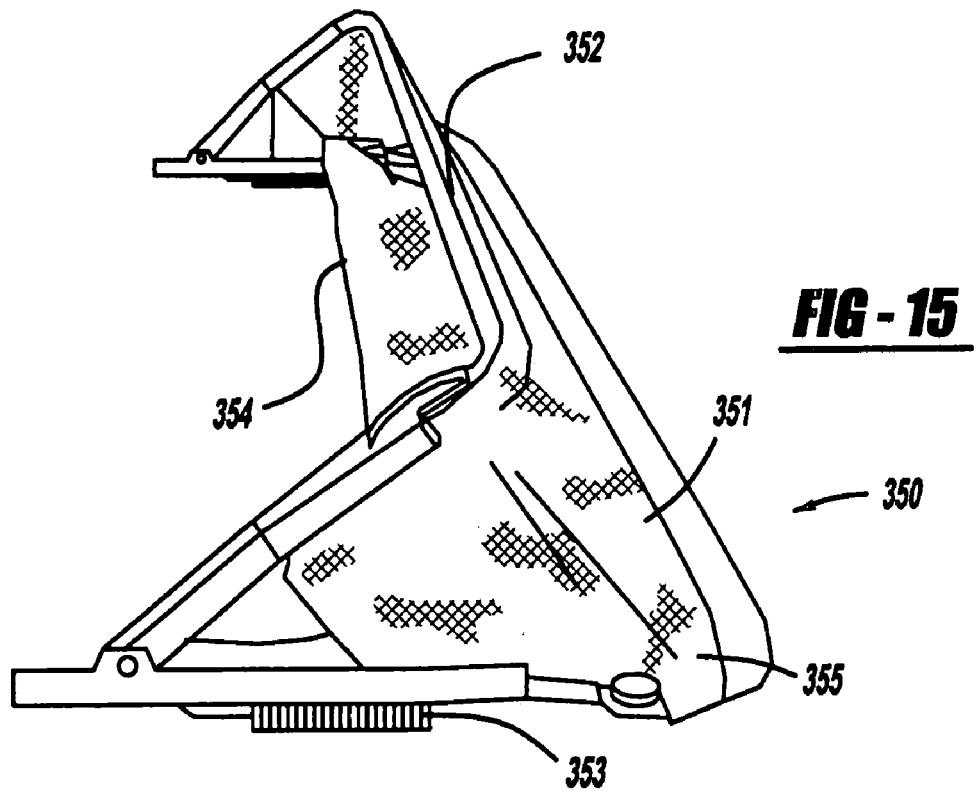
FIG. 15 is a perspective view showing an air deflector employed in the open air system, according to the present disclosure.
Figure 16:
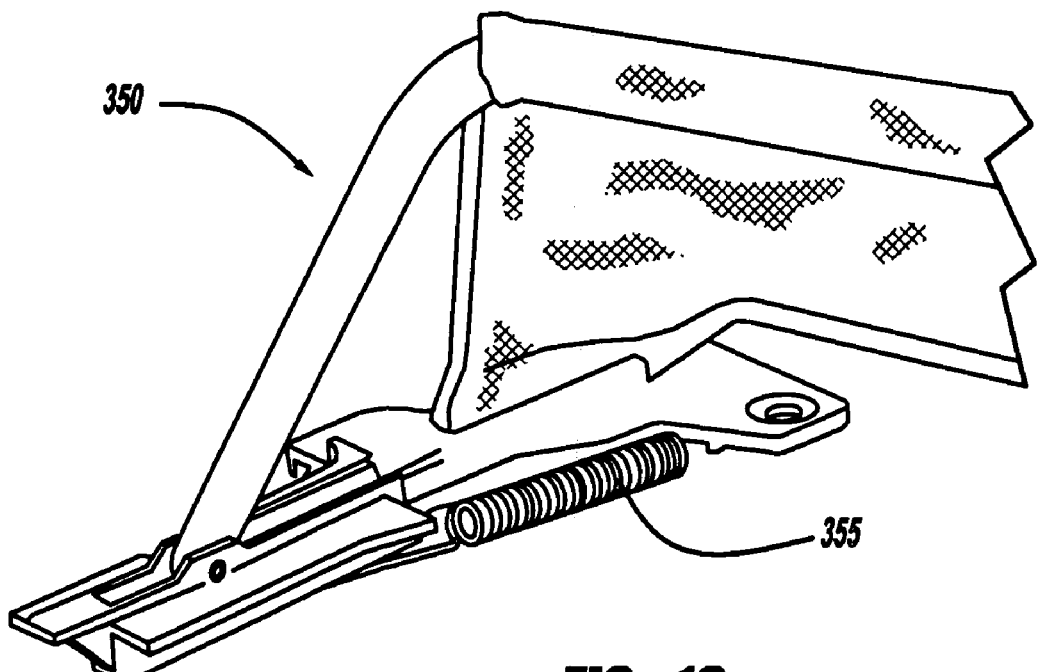
FIG. 16 is an enlarged diagrammatic perspective view showing a bias member of the air deflector.
Figure 17:
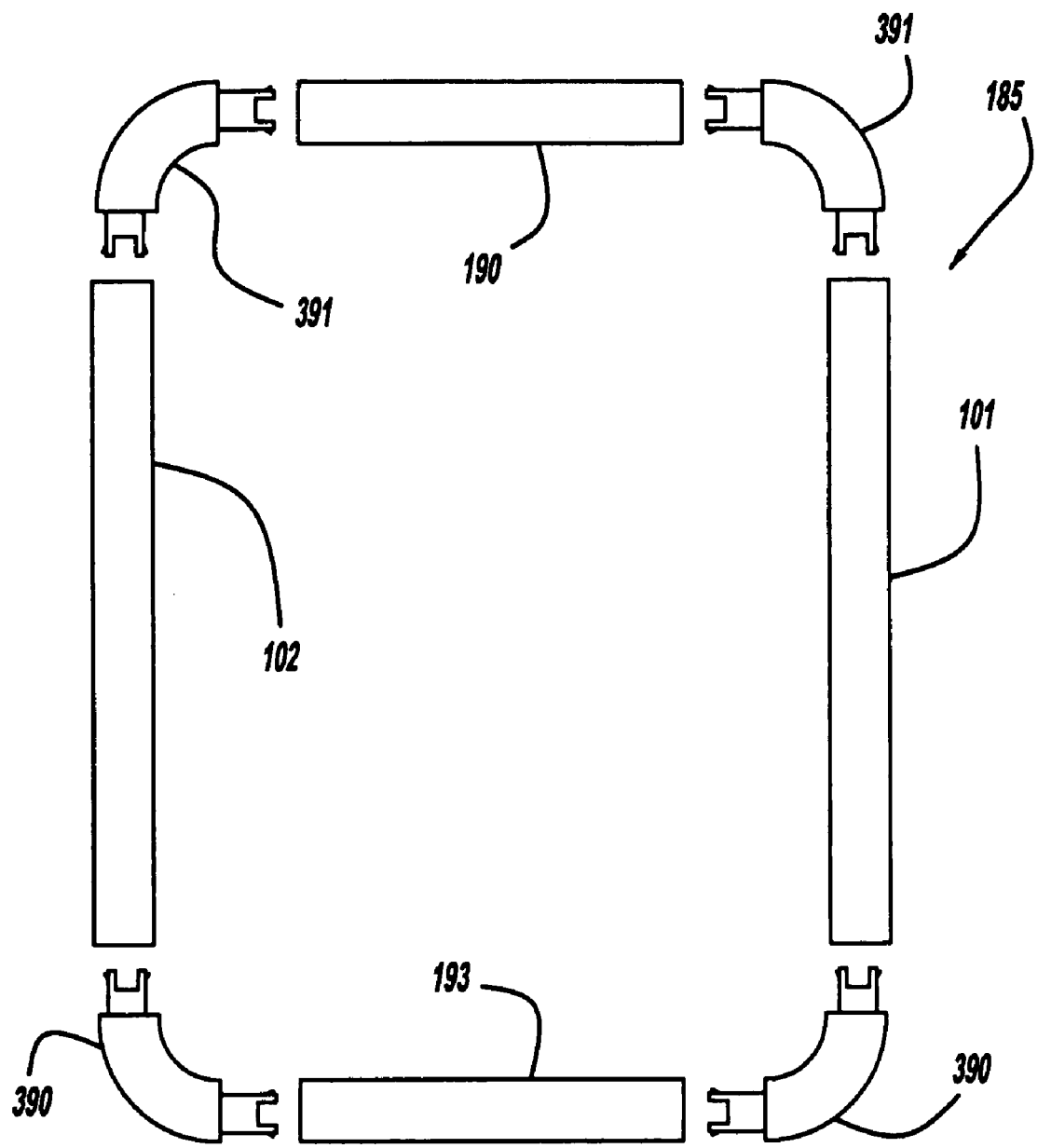
FIG. 17 is a top fragmentary diagrammatic view showing a track module employed in the open air system, according to the present disclosure.
Figure 18:
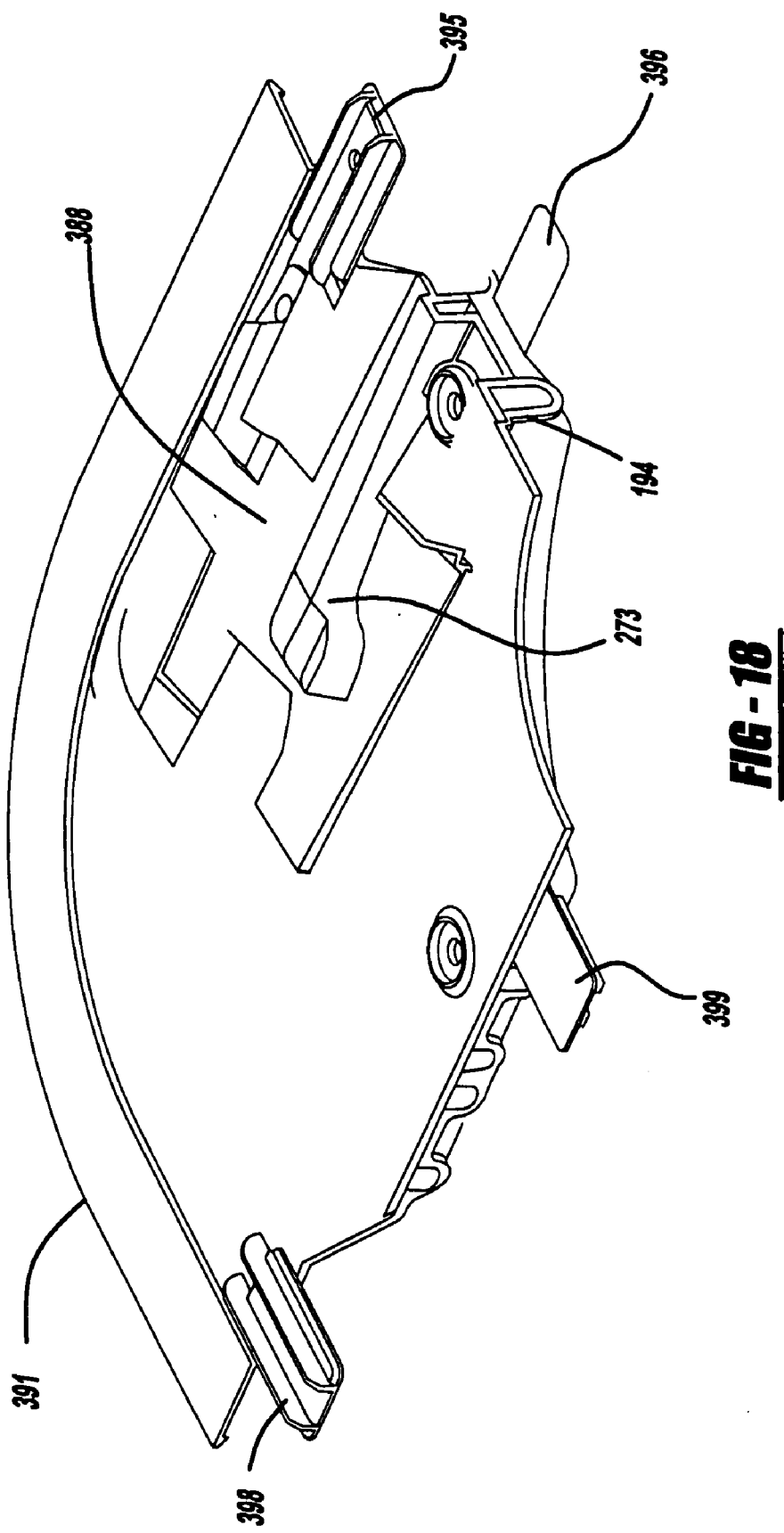
FIG. 18 is a perspective view showing a front corner piece of the track module employed in the open air system, according to the present disclosure.
Figure 19:
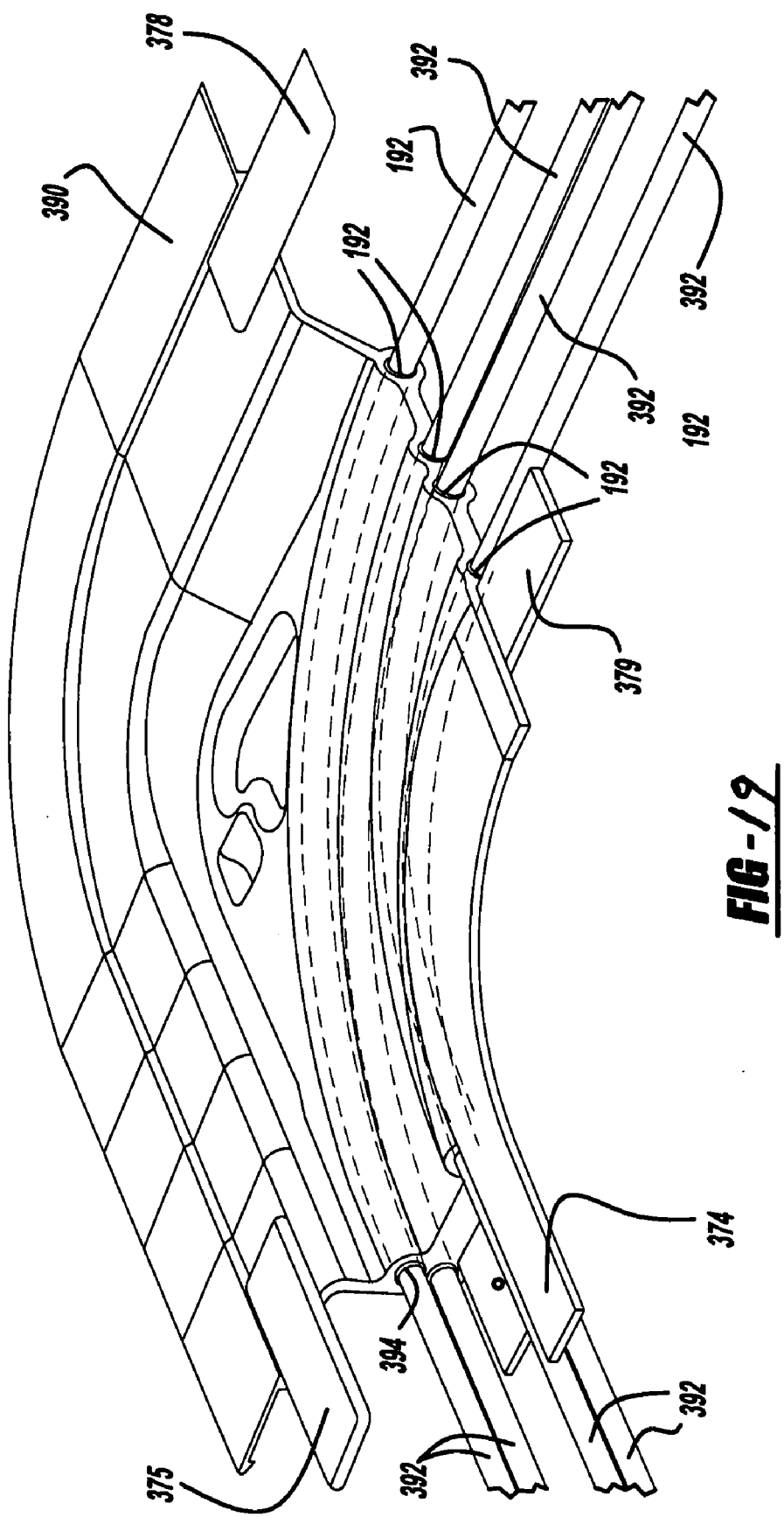
FIG. 19 is a perspective view showing a side rail track and a rear track of the track module employed in the open air system, according to the present disclosure.
Figure 20:
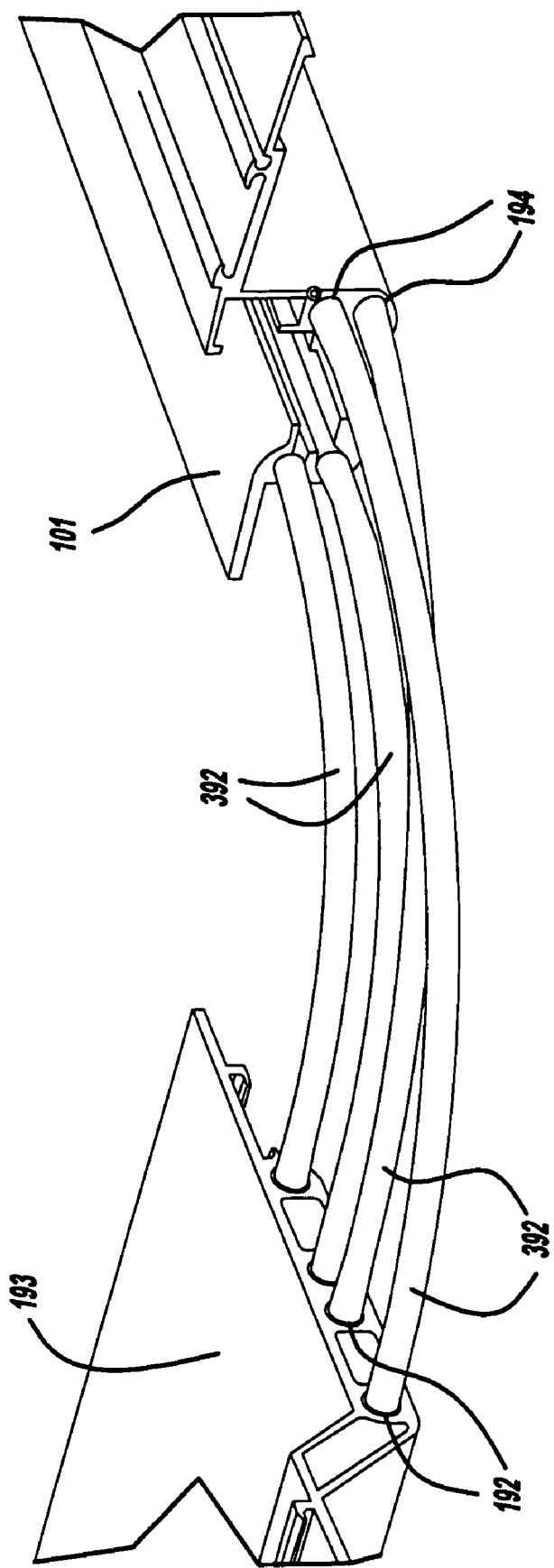
FIG. 20 is a perspective view showing a rear corner piece of the track module employed in the open air system, according to the present disclosure.
Figure 21:
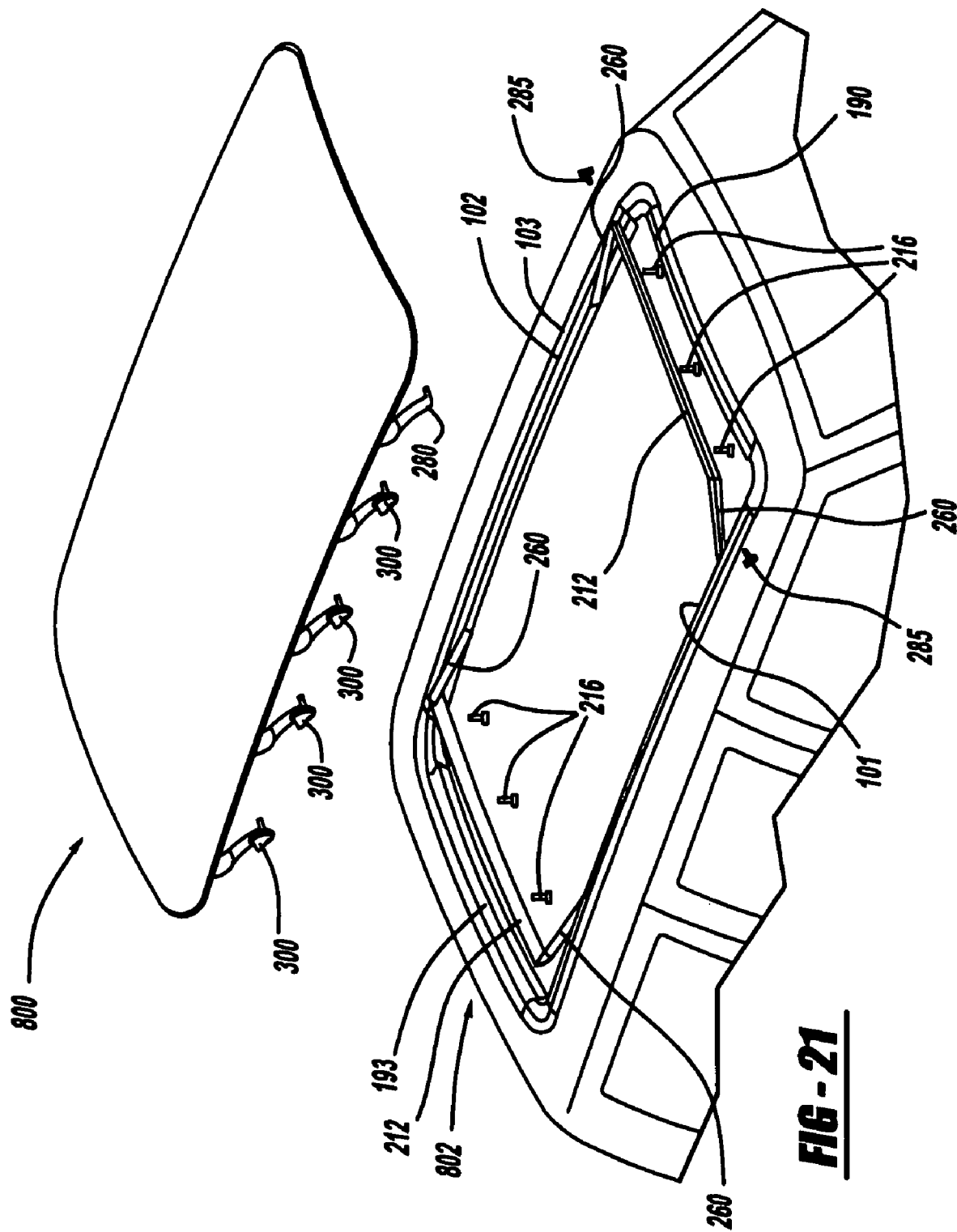
FIG. 21 is a perspective and fragmentary view showing the open air system employing a foldable sunroof module and a guide track module, according to the present disclosure.
Figure 22:
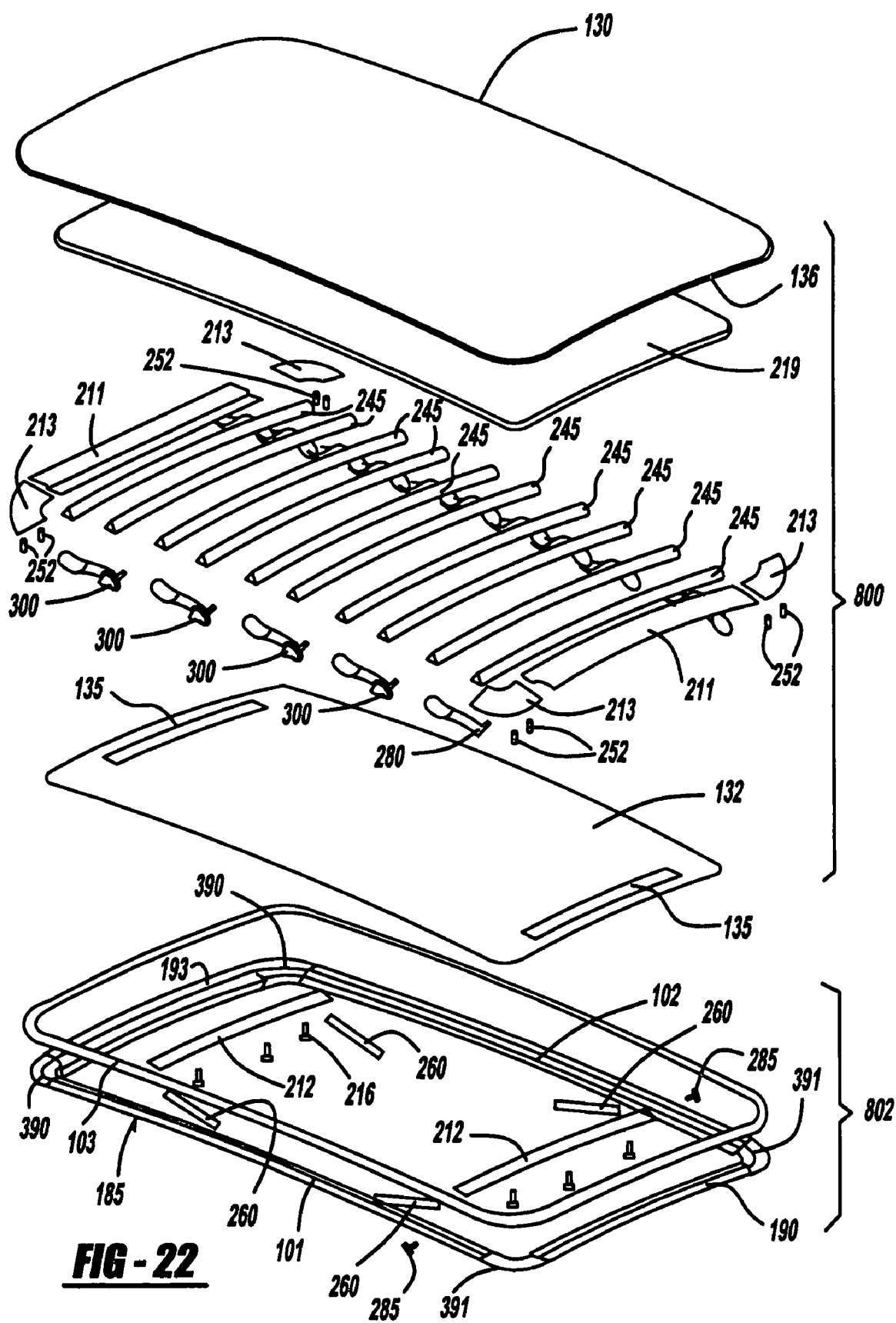
FIG. 22 is a perspective and fragmentary view showing the open air system employing a foldable sunroof and the guide track module assembled in a vehicle, according to the present disclosure.
Figure 23:
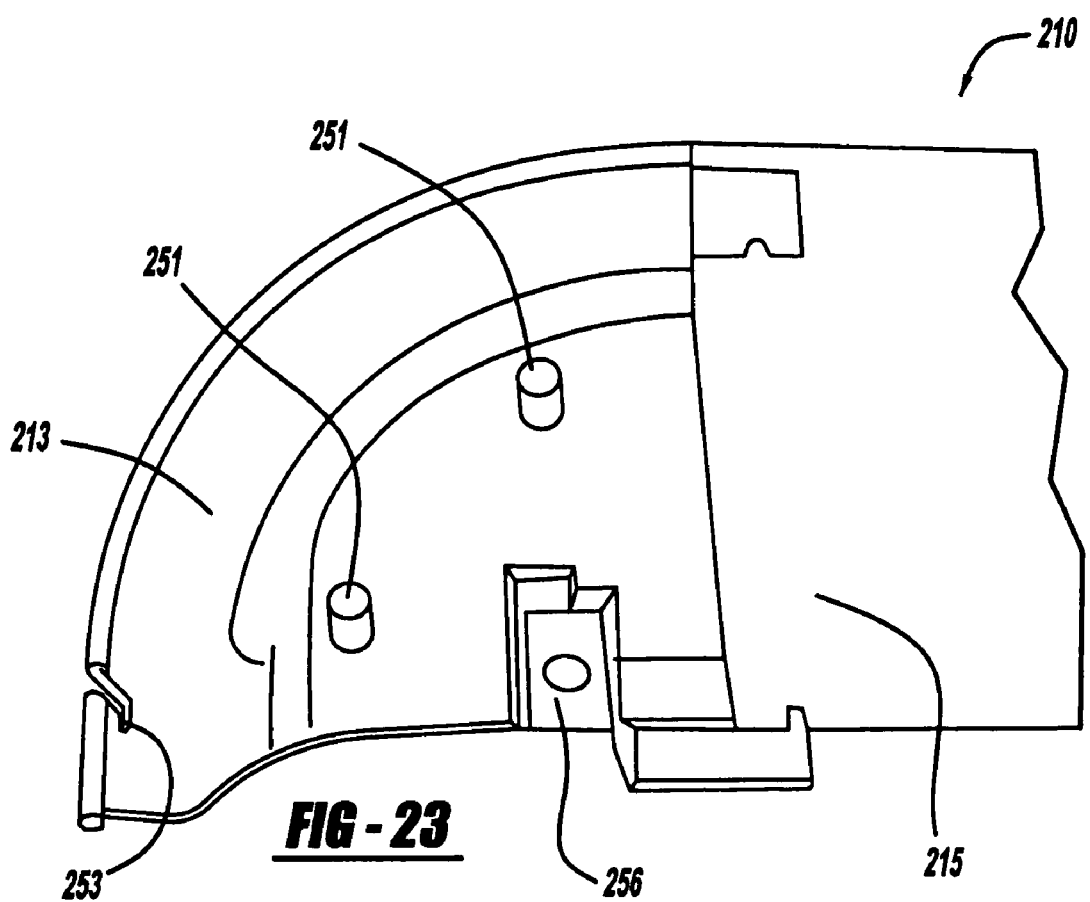
FIG. 23 is a top perspective view of a corner portion showing an end bow, according to the present disclosure.
Figure 24:
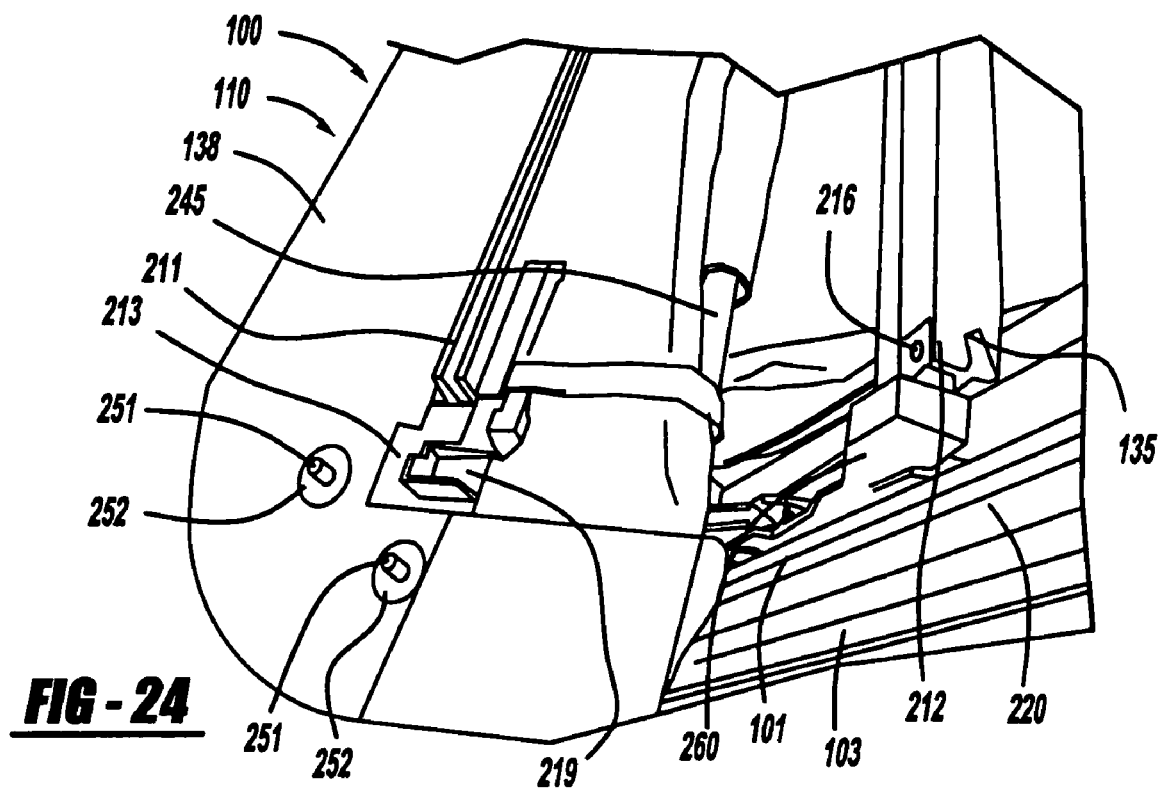
FIG. 24 is a top perspective view showing an end bow upper member and an end bow lower member, according to the present disclosure.
Figure 25:
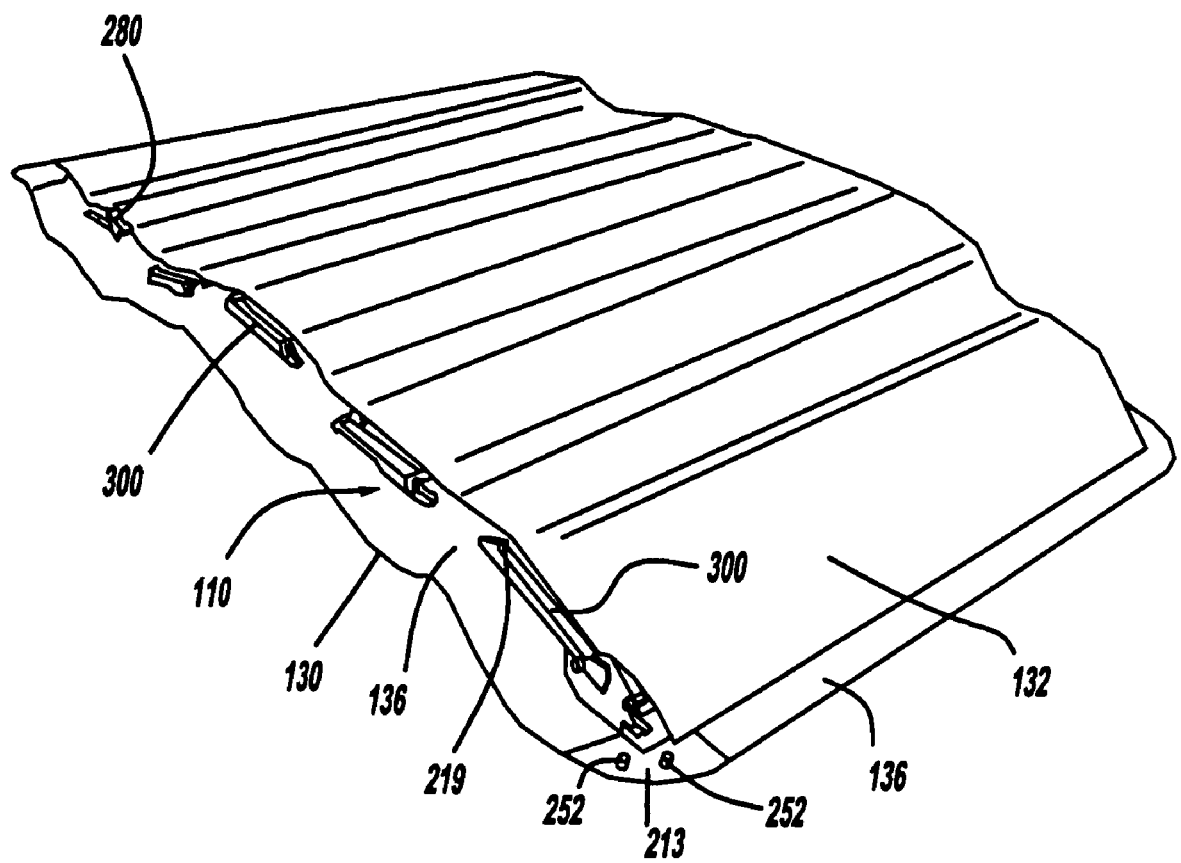
FIG. 25 is a top perspective view showing a sunroof module view from an inside, according to the present disclosure.

Moveable surface 110 raises up and provides a wind deflection, as illustrated in FIG. 11, such that the wind travels over moveable surface 110 and the remainder of moveable surface 110 does not oscillate in the wind. Otherwise, this oscillation in the wind by moveable surface 110 can be very irritating to occupants of vehicle 121 and may be described as a caterpillaring effect. In such a caterpillaring effect, moveable surface 110 will bounce up and down or oscillate and undesireably create noise, low frequency vibration, reduced head room in the interior of vehicle 121, breakage of components in open air system 100 and the like. This caterpillaring effect is especially prone on larger roof openings often on larger vehicles, such as sport utility vehicles. But in the present invention, guide 281 running along lift ramp 220 positions a first fold within moveable surface 110 such that the caterpillar effect is significantly reduced if not entirely eliminated. Front lift arm 280 is connected to two cross bows 245 which are connected to a mirror image of front lift arm 280 to create an assembly. When the assembly is pushed by the wind, the assembly cannot move any further back than guide 281 allows on lift ramp 220. This is very stable and provides a very desirable wind deflector for moveable surface 110. In an alternative embodiment, if moveable surface 110 is opened from the aft, moveable surface 100 raises up as described herein and operates as an air deflector thus minimizing buffeting in the interior compartment of vehicle 121.

With reference to FIGS. 13-16, open air system 100 is illustrated with an additional air deflector 350, which is used to further minimize wind buffeting effects in the interior of vehicle 121. Air deflector 350 includes a member 353 that is attached to vehicle 121 as well as attached to a moving member 351 with a biasing member 355 at their connection. Biasing member 355 which can be a coil spring, allows air deflector 350 to be open when moveable surface 110 is open. When moveable surface 110 closes, it exerts pressures on moving member 351 that are greater than biasing member 355, thus closing air deflector 350. Air deflector 350 also includes cross-vehicle components which are mirror images on the opposite side of vehicle 121. The components of air deflector 350 make a frame that is wrapped by a perforated fabric sheet 324. Sheet 324 is foldable such that it does not inhibit the closing of moving member 352 as it moves in relationship to the closing of moveable surface 110.

Now referring to FIGS. 17-20, a track system 185 is illustrated. Track system 185 includes first track 101 and second track 102 which are essentially parallel. Forward corner pieces 391 are connected on the forward ends of first track 101 and second track 102. Each forward corner piece 391 interfaces with a corresponding track and further interfaces with a front track 190 which is elongated in a cross-vehicle direction. Corner piece 391 is attached to the tracks using lateral appendages 295, 296, 398 and 399. Inserted in corner piece 391 is a cam ramp insert 388 which comprises a cam ramp 373.

Rear corner pieces 390 interface with tracks 101 and, by way of 102 lateral appendages 375 and 374. More or less lateral appendages may be used based on the design and strength needed for track system 185. Moreover, rear corner piece 390 is attached to rear track 193 by lateral appendages 378 and 379, and rear corner piece 390 includes four cable guides 192 that have drive cables 392 running through them. Drive cables 392 operably open and closed open air system 100. Rear corner piece 390 allows drive cables 392 to come from rear track 193 along one plane and enter the track 101 or 102 in a stack parallel configuration. Rear track 193 preferably includes two electric motors 195 mounted thereto.

Modular components of open air system 100 are illustrated in FIGS. 21-25. A first module 800 includes moveable surface 110 and its operating components. A second module 802 can be permanently affixed to the stationary vehicle roof after installation and includes track system 185 which further includes motors 195, control unit 196, and seal 103. In addition, second module 802 can include the connecting parts. First module 800 is installed as a unit onto second module 802 and first module 800 may be removed as a unit from second module 802 after initial assembly. Reasons for removing first module 800 from second module 802 include serviceability such as maintenance, replacement, upgrades, and the like.

First module 800 includes moveable surface 110 which comprises cover material 130, padding 219, cross bows 245, and lift assemblies 300. First module 800 additionally includes a partial front bow 210 comprising top member 211 and corner pieces 213, and a partial rear bow 218 comprising top member 211 and two corner pieces 213. Furthermore, first module 800 includes front lift arms 280, underlayment sheet 136, headliner 132, and a wire or tension cable 254 which is attached between two of corner pieces 213. The underlayment sheet 136 is attached to each corner piece 213 over posts 151 and fastened using fastener 252. First module 800 is pre-assembled as a unit before vehicle installation.

First module 800 preferably has four pairs of lift assemblies 300, one pair of first lift arms 280, ten cross bows 245, four corner pieces 213, two top members 211, eight fasteners 252, cover material 130 and padding 219. In addition, first module includes headliner 132 and its fasteners 135. Second module includes track system 185, two electric motors 195, control unit 196, as well as drive cables 392, pinion gears and other such operational mechanisms and electronics. In addition, second module 802 contains seal 103, two bottom members 212, at least six fasteners 216, two pins 285, four connection members 260 and air deflector 350.

When connecting first module 800 to second module 802, slider pieces 312 are slid into first track 101 and second track 102. In an alternative embodiment of the invention, connection member 260 is already engaged in track system 185 as part of second module 802. In an alternative embodiment, connection member 260 is connected to bottom member 212 of either front bow 210 or rear bow 218. In yet another embodiment of the invention, after lift assemblies 300 have been attached in both first track 101 and second track 102, front lift arm 280 is connected to connection member 260 by pin 285. Then front bow 210 is completed by connecting connection member 260 at attachment point 256 of corner piece 213, whereafter bottom member 212 is attached to top member 211 using fastener 216. Hook-and-loop fastener 135 on headliner 132 is optionally connected to bottom member 212. The same procedure is employed for connecting corner pieces 213 and bottom member 212 as well as fastening headliner 132 for rear bow 218.

To remove first module 800 from second module 802, hook-and-loop fastener 135 is disengaged to provide access to fasteners 216. Fasteners 216 are then removed thus freeing bottom member 212 from top member 211 of front bow 210. The same procedure is also done for rear bow 218. Thereafter, connection member 260 is disconnected from corner pieces 213 at all four corners. Next, pin 285 is removed from connection member 260 thereby freeing front lift arm 280. Finally, lift arms 315 are snapped out of the slider pieces 312.

Figure 26:
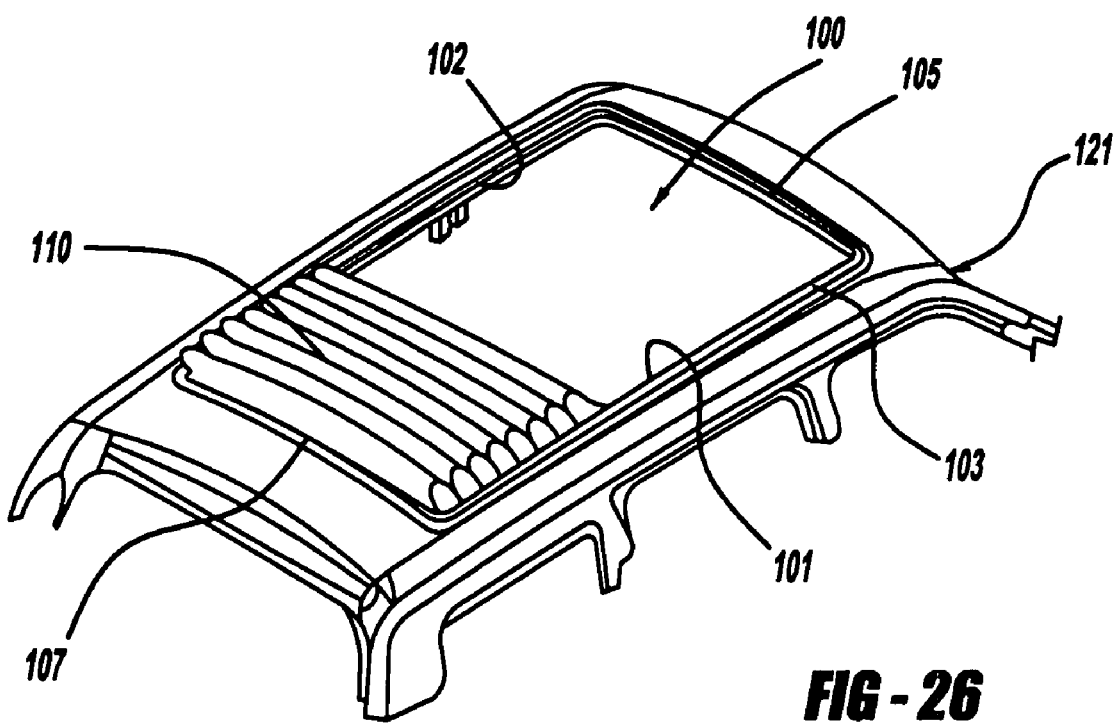
FIG. 26 is a perspective view of a partial vehicle showing the preferred embodiment of an open air system in an open position, according to the present disclosure.
Figure 27:
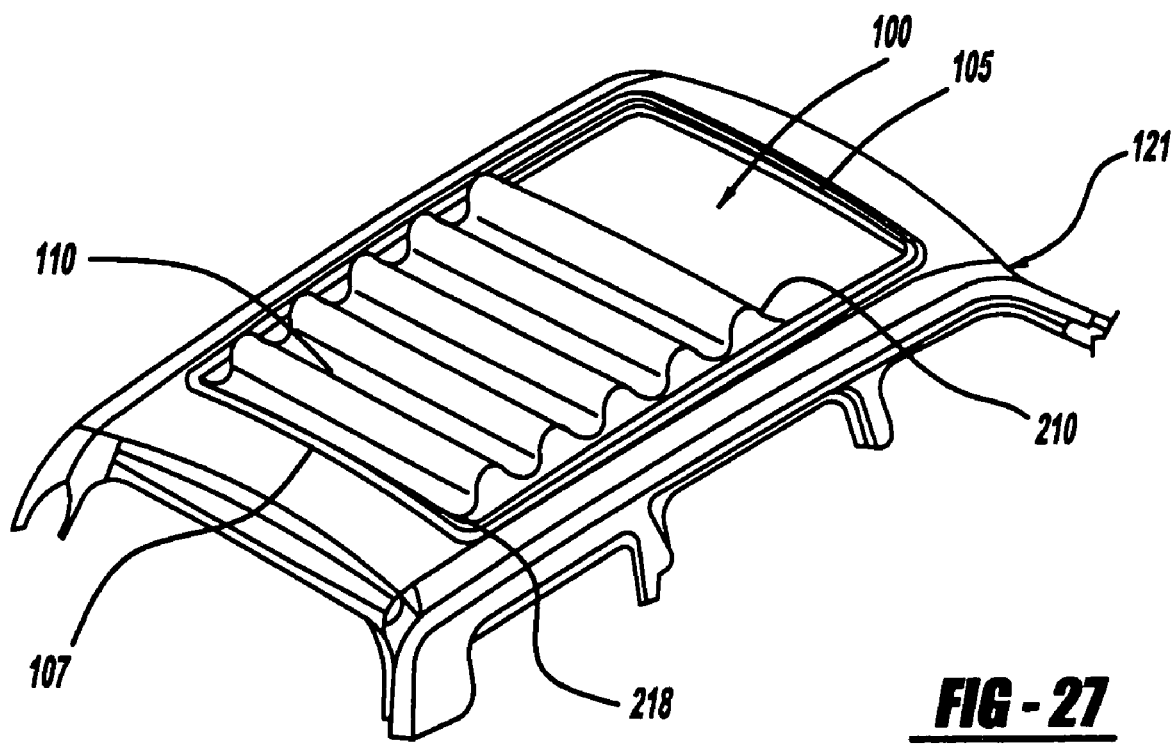
FIG. 27 is a perspective view of the partial vehicle showing the open air system in a first step toward a closed position, according to the present disclosure.
Figure 28:
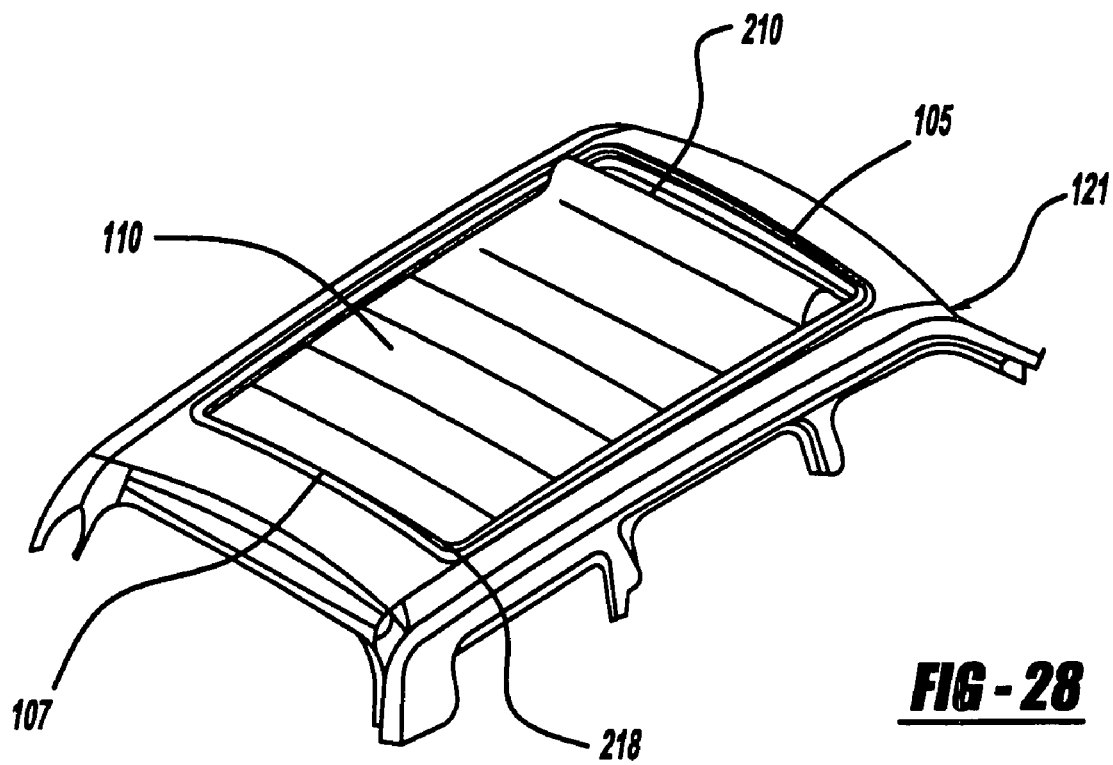
FIG. 28 is a perspective view of the partial vehicle showing the open air system in a second step toward the closed position, according to the present disclosure.
Figure 29:
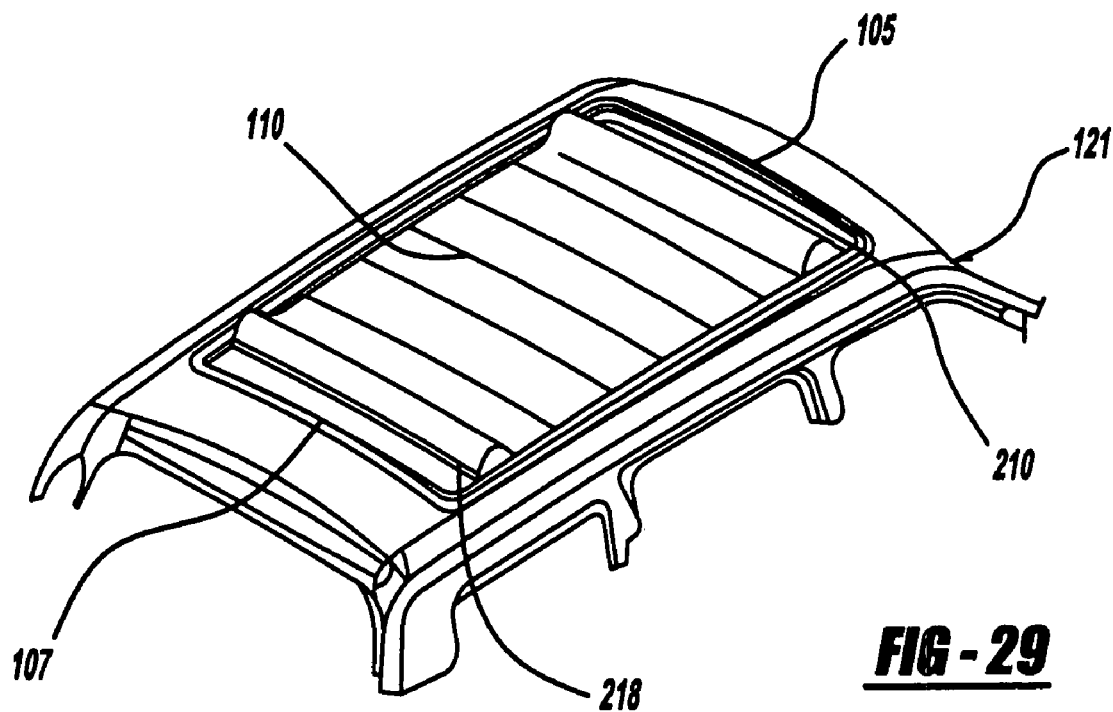
FIG. 29 is a perspective view of the partial vehicle showing the open air system in a third step toward the closed position, according to the present disclosure.
Figure 30:
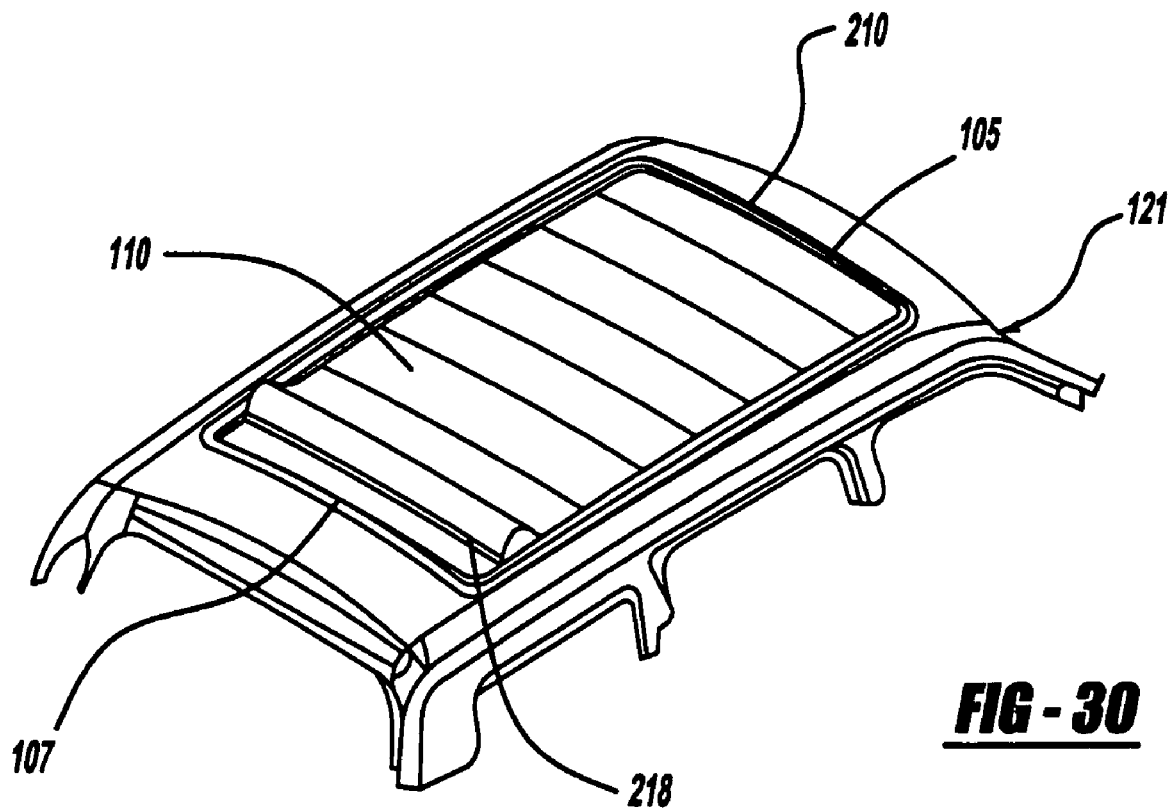
FIG. 30 is a perspective view of the partial vehicle showing the open air system in a final step toward the closed position, according to the present disclosure.
Figure 31:
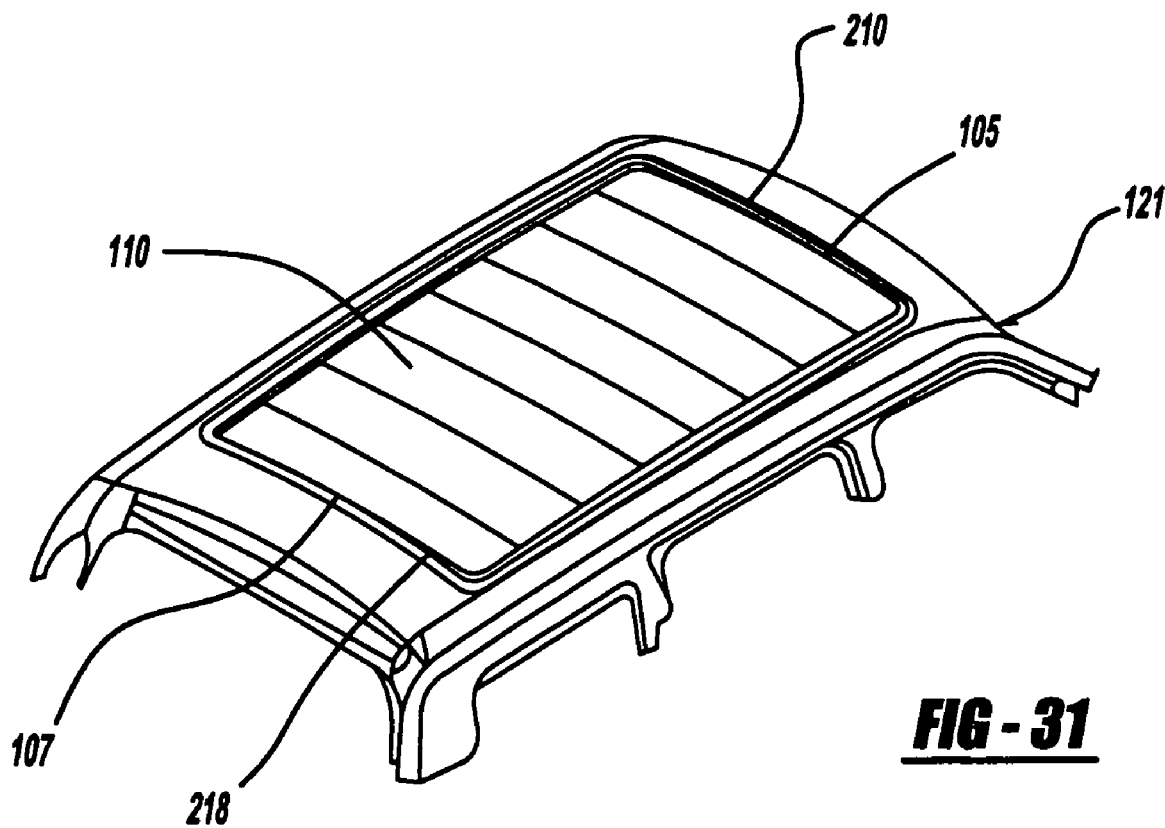
FIG. 31 is a perspective view of the partial vehicle showing the open air system in a fully closed position, according to the present disclosure.

With reference to FIG. 26, open air system 100 is in an open position and with reference to FIGS. 27-31, a closing method is described. Moveable surface 110 includes front bow 210 and rear bow 218. Both front bow 210 and rear bow 218 are moveable either individually or simultaneously. In FIG. 27, movable surface 110 moves forward towards front portion 105 of seal 103. As shown in FIG. 28, when movable surface 110 nears front portion 105 of seal 103, movable surface 110 stops. The distance away from front portion 105 of seal 103 in which movable surface 110 stops is controlled by the control unit 196 which may be programmable to a distance that may be preferred for a particular vehicle application. In some vehicles, the distance at which movable surface 110 is stopped can be less than 50 centimeters but more typically can be less than 100 millimeters and more preferably less than 50 millimeters. As shown in FIG. 29, rear bow 218 of movable surface 110 is then moved away from rear portion 107 of seal 103. The distance of the rear portion 107 from seal 103 is a vented position of the rear bow 218. The movement of rear bow 218 of movable surface 110 away from rear portion 107 of seal 103 releases tension on drive cables, thus lowering stress on motors 195 for the closing of open air system 100. Referring to FIG. 30, the front bow 210 of movable surface 110 is moved toward front portion 105 of seal 103 such that movable surface 110 is engaged with seal 103. Finally, as shown in FIG. 31, rear bow 218 of movable surface 110 is moved towards rear portion 107 of seal 103. This movement engages rear bow 218 of movable surface 110 with seal 103. As illustrated in FIG. 31, open air system 100 is in a closed position.

Figure 32:
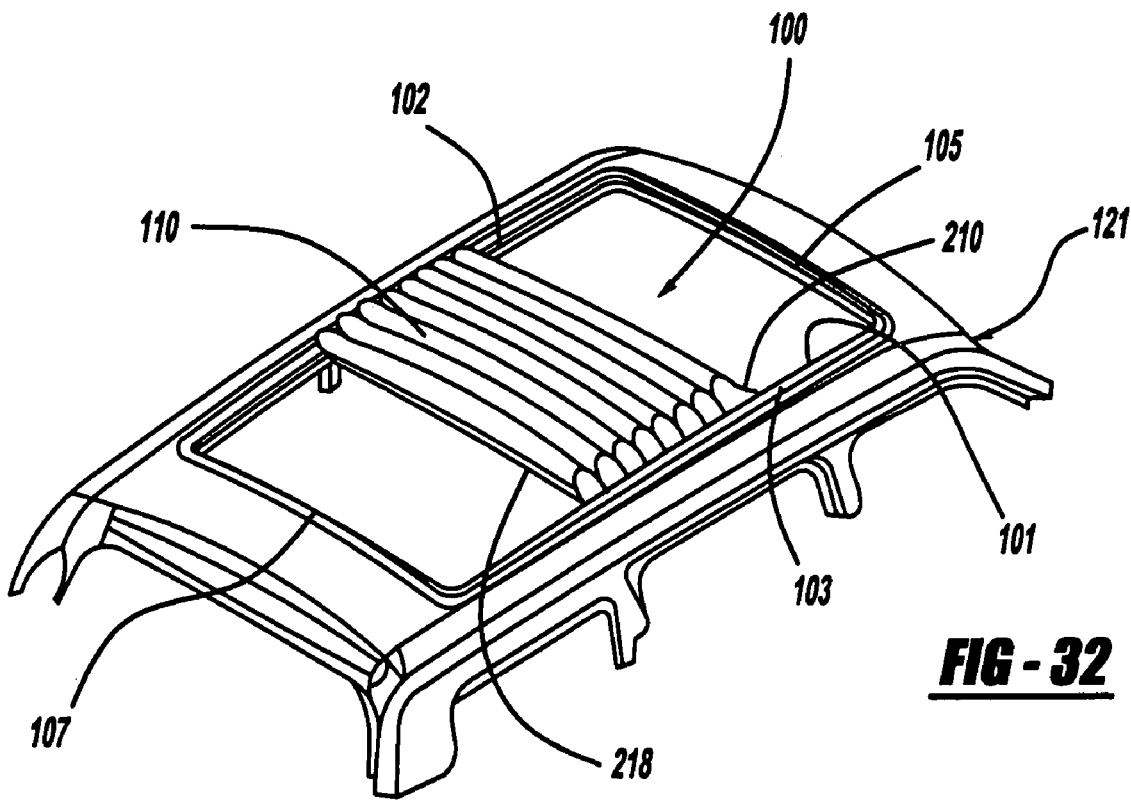
FIG. 32 is a perspective view of a partial vehicle showing an open air system in an alternative open position, according to the present disclosure.
Figure 33:
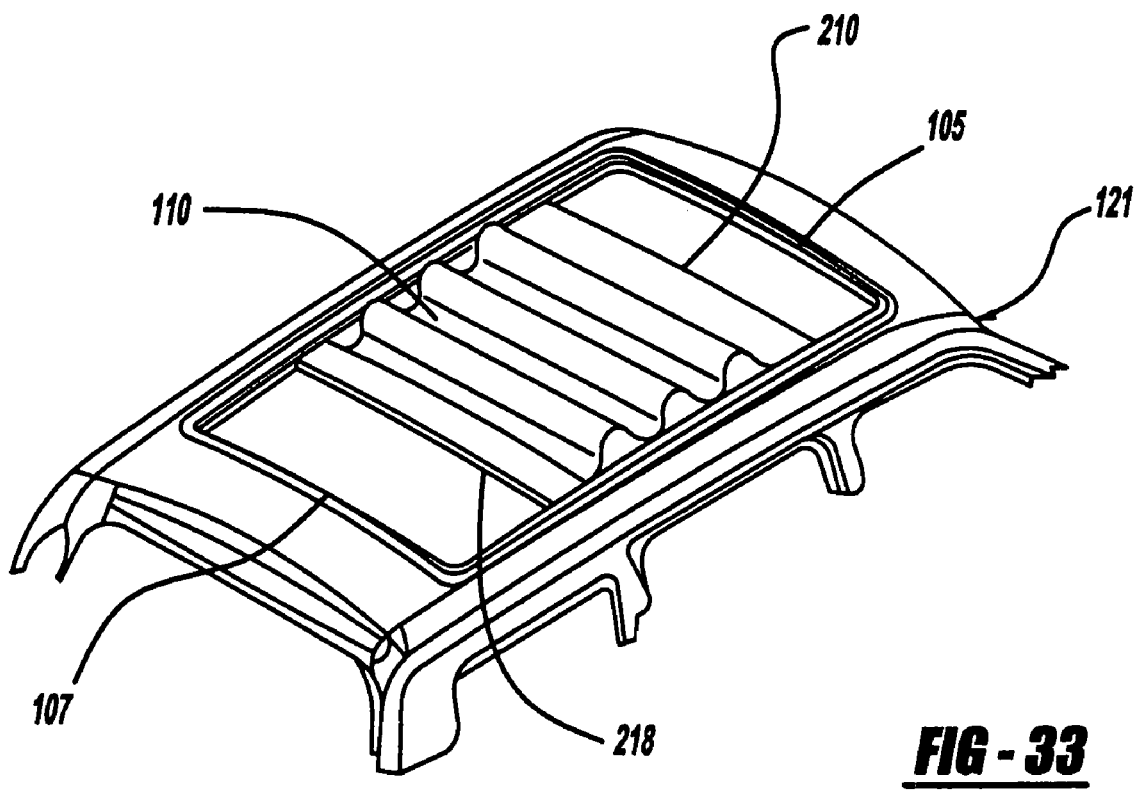
FIG. 33 is a perspective view of the partial vehicle showing the open air system in a first step toward a closed position, according to the present disclosure.

With reference to FIG. 32, open air system 100 is in an alternative open position having front bow 210 of movable surface 110 moved towards the aft, and rear bow 218 of movable surface 110 moved forward. With reference again to FIG. 32, open air system is in an open position in which movable surface 110 has an opening in both the fore and the aft portions of open air system 100. In such an open position, front bow 210 is moved away from front portion 105 of seal 103 towards the aft, and rear bow 218 is moved forward away from rear portion 107 of seal 103. It will be appreciated that an infinite number of open positions is possible in this configuration.

Figure 34:
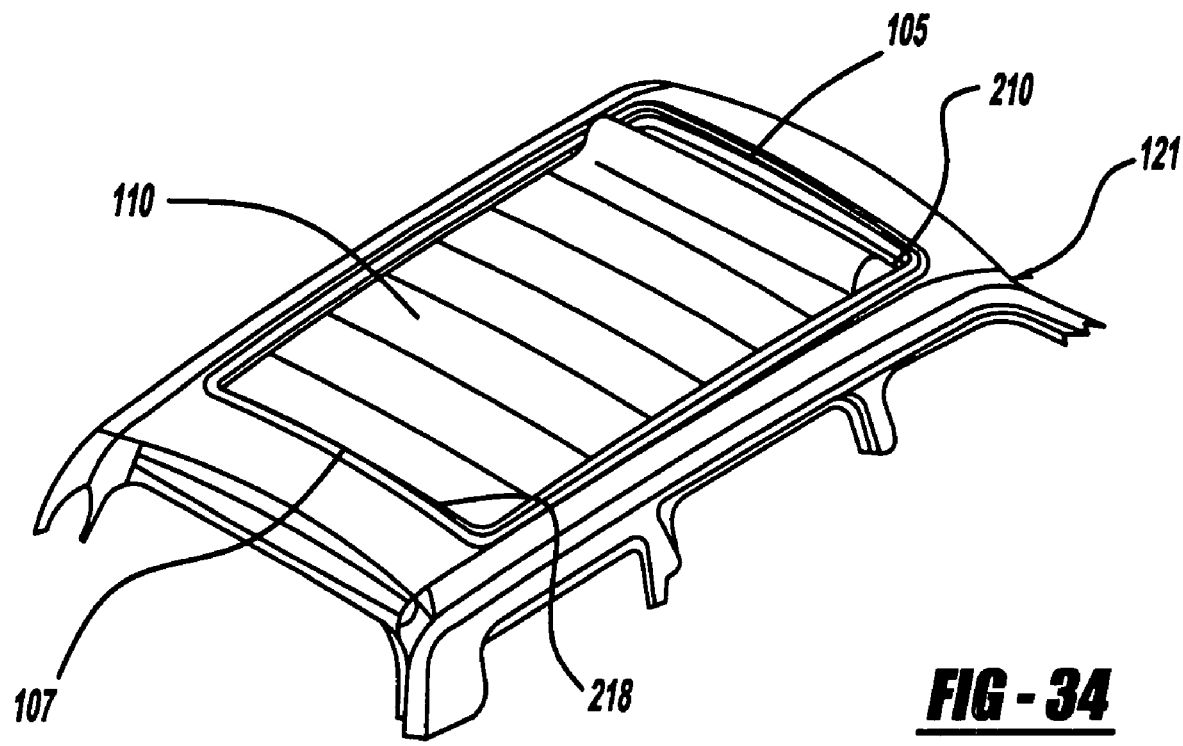
FIG. 34 is a perspective view of the partial vehicle showing the open air system in a second step toward the closed position, according to the present disclosure.
Figure 35:
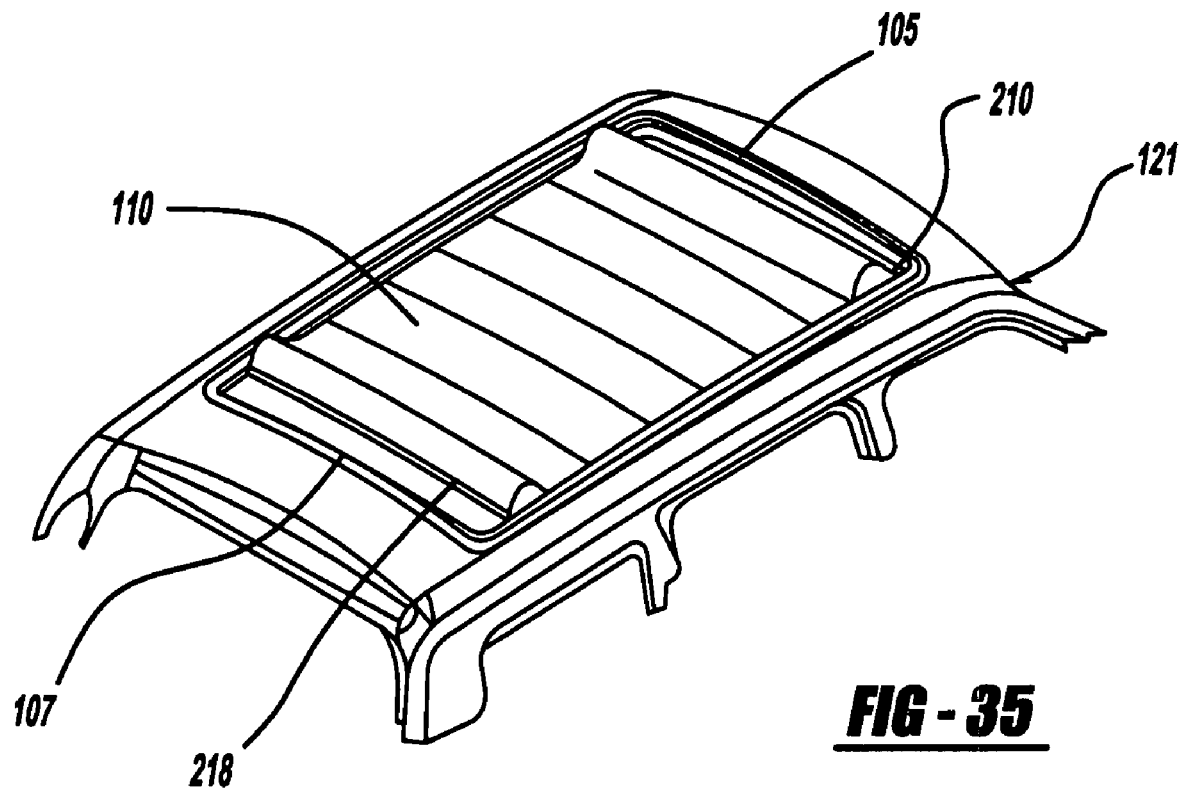
FIG. 35 is a perspective view of the partial vehicle showing the open air system in a third step toward the closed position, according to the present disclosure.
Figure 36:
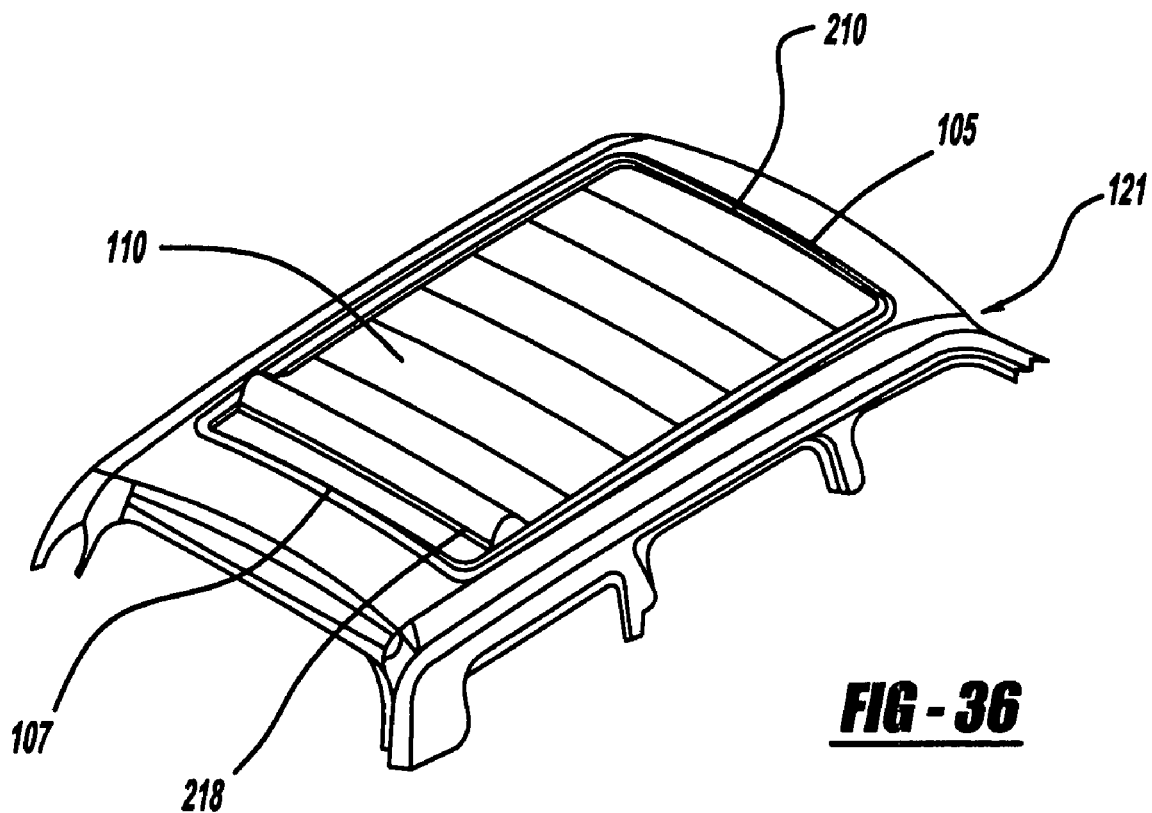
FIG. 36 is a perspective view of the partial vehicle showing the open air system in a final step toward the closed position, according to the present disclosure.
Figure 37:
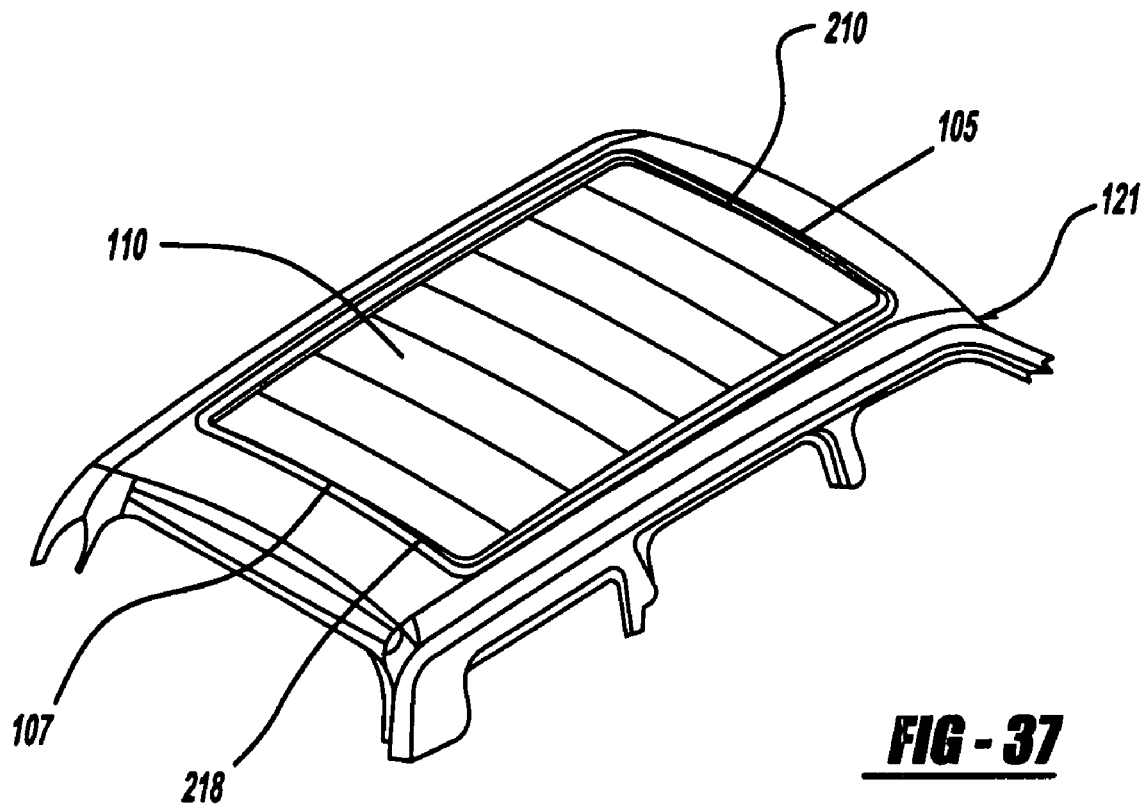
FIG. 37 is a perspective view of the partial vehicle showing the open air system toward the closed position, according to the present disclosure.

With reference to FIGS. 33-37, when closing the alternative open position of open air system 100, front bow 210 and rear bow 218 may be moved simultaneously towards seal 103. In some aspects of the invention or at the option of the operator, front bow 210 and rear bow 218 may be moved individually toward seal 103. As front bow 210 nears front portion 105 of seal 103 it may be stopped a distance away from seal 103. In an aspect of the invention, front bow 210 may be stopped short of front portion 105 of seal 103 and rear bow 218 may be engaged with rear portion 107 of seal 103. as shown in FIG. 34. Rear end bow 218 is moved away from rear portion 107 of seal 103. as shown in FIG. 35, then front bow 210 is moved into engagement with front portion 105 of seal 103. as shown in FIG. 36. This is followed by movement of rear bow 218 into engagement with rear portion 107 of seal 103, as shown in FIG. 37. During simultaneous movement of front bow 210 and rear bow 218 as movable surface 110 is being moved to a closed position, rear bow is stopped at a pre-programmed point that is short of rear portion 107 of seal 103 then front bow 210 continues forward until it engages with front portion 105 of seal 103. Finally, rear bow 218 is moved into engagement with rear portion 107 of seal 103. FIG. 37 shows open air system 100 in a closed position. The advantages using such methods to close open air system 100 include less torque needed on motors to close front bow 210, and allowing the sunroof motors to be positioned in the aft of the vehicle roof away from the front seat occupants such that any noise or vibration from the motors may be away from the occupants and not an annoyance.

In the preferred embodiment, when open air system 100 is in an opened position as illustrated in FIG. 26, the rear bow 218 is in the vented position. For example, in the vented position, rear bow 218 can be the minimum distance away from rear portion 107 of seal 103 as to let air pass through the open. The distance can be adjusted to allow a larger volume of air to pass which may be useful with a larger aperture area that is opened. Controller 196 can be programmed to automatically position the rear bow 218 in a vented position when the moveable surface 110 is opened. In addition, controller 196 can programmed to automatically position the rear bow 218 at different distances away from rear portion 107 of seal 103 dependant on the distance that front bow 210 is away from front portion 105 of seal 103. The advantage of the vented position is that it minimizes or essentially eliminates buffeting in the interior compartment of vehicle 121. The relationship of the vented position distance to an open distance of moveable surface 110 maybe determined in wind tunnel testing or test driving a prototype vehicle. The relationships can be programmed into controller 196 so that the movement to the vented position is automatic. When closing moveable surface 110 as described above, rear bow 218 can remain in the vented position as front bow 210 is closed, then rear bow 218 is closed. It is apparent that in the methods of closing moveable surface 110 and of the vented position of the moveable surface 110, that front bow 210 and rear bow 218 are interchangeable. For example if moveable surface 110 is opened by moving rear bow 218 forward, forward bow 210 is moved to the vented position. Various embodiments described herein can alternately be employed to cover a bed of a pick-up truck.

The embodiments and examples described herein are exemplary and not intended to be limiting in describing the full scope of devices, apparatus, systems, and methods of the present disclosure. Equivalent changes, modifications and variations of the embodiments, materials, compositions and methods can be made within the scope of the present disclosure, with substantially similar results.

What is claimed is:

1. A method of closing a vehicular system having a moveable front bow and a moveable rear bow, the method comprising:
    moving the front bow forward;
    releasing tension from the rear bow;
    moving the front bow to a closed position; and
    moving the rear bow to a closed position.

2. The method according to claim 1 further comprising: stopping the moving the front bow forward before the front bow meets a front seal member.

3. The method according to claim 2 further comprising moving the rear bow aftward before the step of stopping the moving the front bow forward before the front bow meets a front seal member.

4. The method according to claim 2 further comprising sealing the rear bow to a rear seal before the step of stopping the moving the front bow forward before the front bow meets a front seal member and before the releasing tension from the rear bow.

5. A method for installing a complete open air vehicular system, the method comprising:
    providing a vehicle roof having an aperture;
    installing a track module in the aperture;
    installing a roof module onto the track module, the roof module comprising:
        a pliable cover material;
        a plurality of lift assemblies, each of the lift assemblies comprising a slider member, and an assembly lift arm connected to the slider member at a pivot;
        a pair of front lift arms;
        an upper portion of a forward bow; and
        an upper portion of a rear bow;
    wherein the installing includes sliding the plurality of lift assemblies into the track module, connecting the pair of front lift arms to the track module, fastening the upper portion of both the forward and the rear bow to the track module, the forward bow and the rear bow are connected to cables, and the cables are driven by two motors located in a rear portion of the vehicle.

6. The method according to claim 1 wherein the releasing tension from the rear bow is opening the rear of the roof less than 50 centimeters.

7. The method according to claim 1 wherein the vehicular system is an open air vehicular roof.

8. A method for installing a complete open air vehicular system the method comprising:
    providing a vehicle roof having an aperture;
    installing a track module in the aperture;
    installing a roof module onto the track module, the roof module comprising:
        a pliable cover material;
        a plurality of lift assemblies, each of the lift assemblies comprising a slider member, and an assembly lift arm connected to the slider member at a pivot;
        a pair of front lift arms;
        an upper portion of a forward bow; and
        an upper portion of a rear bow,
    wherein the installing includes sliding the plurality of lift assemblies into the track module, connecting the pair of front lift arms to the track module, fastening the upper portion of both the forward and the rear bow to the track module, each of the front lift arms comprise at least one cross bow connection located on the front arm above a pivot point and a guide member located on the front arm on a side opposite the at least one cross bow connection.

9. The method according to claim 8 wherein the track module comprises:
    at least one guide track having at least one drive cable;
    at least one corner piece;
    a seal member;
    at least one lower end bow member connected to a connection member;
    at least one fastener; and
    a pin for fastening the front lift arm to the connection member.

10. The method according to claim 8 wherein the roof module further comprises at least two cross bow connections located on the assembly lift arm above the pivot point each of the lift assemblies being moveable from a neutral position to a lift position.

11. A method for installing a complete open air vehicular system, the method comprising:
    providing a vehicle roof having an aperture;
    installing a track module in the aperture;
    installing a roof module onto the track module, the roof module comprising:
        a pliable cover material;
        a plurality of lift assemblies, each of the lift assemblies comprising a slider member, and an assembly lift arm connected to the slider member at a pivot;
        a pair of front lift arms;
        an upper portion of a forward bow; and
        an upper portion of a rear bow,
    wherein the installing includes sliding the plurality of lift assemblies into the track module, connecting the pair of front lift arms to the track module, fastening the upper portion of both the forward and the rear bow to the track module,
    wherein the roof module further comprises a plurality of cross bows connected to the plurality of lift assemblies and the pair of front lift arms.

12. The method according to claim 8 wherein the roof module further comprises a headliner having a portion of a hook and eye type fastener on a fore and an aft portion of the headliner.

13. A method for servicing an open air vehicular system, the method comprising:
    providing a vehicle having an open air vehicular system comprising a foldable sunroof module and a track module, the sunroof module installed in the track module, the sunroof module comprising:
        a cover material;
        a plurality of lift assemblies, each of the lift assemblies comprising a slider member, and an assembly lift arm connected to the slider member at a pivot;
        a pair of front lift arms;
        an upper portion of a forward bow; and
        an upper portion of a rear bow;
    removing a fastener from both the front bow and the rear bow;
    removing at least one pin connecting the front lift arm to the track module; and
    removing the assembly lift arm from the slider member from each of the plurality of lift assemblies,
    wherein the sunroof module further comprises a plurality of crossbows connected to the plurality of lift assemblies and the pair of front lift arms, an upper portion of a forward bow, an upper portion of a rear bow.

14. The method according to claim 13, wherein the sunroof module further comprises at least two cross bow connections located on the assembly lift arm above the pivot point each of the lift assemblies being moveable from a neutral position to a lift position.

15. A method for servicing an open air vehicular system, the method comprising:
    providing a vehicle having an open air vehicular system comprising a foldable sunroof module and a track module, the sunroof module installed in the track module, the sunroof module comprising:
        a cover material;
        a plurality of lift assemblies, each of the lift assemblies comprising a slider member, and an assembly lift arm connected to the slider member at a pivot;
        a pair of front lift arms;
        an upper portion of a forward bow; and
        an upper portion of a rear bow;
    removing a fastener from both the front bow and the rear bow;
    removing at least one pin connecting the front lift arm to the track module; and
    removing the assembly lift arm from the slider member from each of the plurality of lift assemblies,
    wherein each of the front lift arms comprise at least one cross bow connection located on the front lift arm above a pivot point and a guide member located on the front lift arm on a side opposite the at least one cross bow connection.

16. The method according to claim 13, further comprising replacing the sunroof module by installing a new sunroof module onto the track module.

17. The method according to claim 13, wherein the track module comprises:
    at least one guide track having at least one drive cable;
    at least one corner piece;
    a seal member;
    two sets of bottom bow members connected to a pair of connecting members;
    a plurality of threaded fasteners; and
    a pair of pins for fastening the front lift arms to one of the pair of connecting members.

18. A foldable sunroof module comprising:
    a cover material;
    an insulation layer;
    a plurality of lift assemblies, each of the lift assemblies comprising a slider member, an arm connected to the slider at a pivot;
    a pair of front lift arms, connections located on the arm above a pivot point and a guide member located on the arm;
    a plurality of crossbows connected to the plurality of lift assemblies and the pair of front lift arms;
    an upper portion of a forward bow; and
    an upper portion of a rear bow.

19. The module according to claim 18, wherein the cover material further comprising an underlayment sheet bound to the cover material.

20. The module according to claim 19 further comprising plurality of fasteners for fastening the underlayment sheet to one of the front bow and the rear bow.

21. The module according to claim 18 wherein each of the lift assemblies comprise a bias from the arm to the slider.

22. The module according to claim 18 wherein the lift assemblies further comprise at least two cross bow connections located on the arm above the pivot point in the lift position.

23. The module according to claim 18 further comprising a structure extending from the arm of each of the lift assemblies, the structure assisting in sealing the sunroof module in a closed position.

24. The module according to claim 18 further comprising a structure extending from the front lift arms, the structure assisting in sealing the sunroof module in a closed position.

25. A foldable sunroof system comprising
    a moveable cover module; and
    a track module, wherein the moveable cover module comprises a pliable cover material, a plurality of lift assemblies, each of the lift assemblies comprising a slider member, an arm connected to the slider at a pivot, a pair of front lift arms, having a guide member located on the arm, a plurality of crossbows connected to the plurality of lift assemblies and the pair of front lift arms, an upper portion of a forward bow, and an upper portion of a rear bow, and wherein the track module comprises a guide track module comprising at least one guide track having at least one drive cable, at least one corner piece, a seal member, two sets of lower end bow members connected to a pair of connecting members; a plurality of threaded fasteners, and a pair of pins for fastening the front lift arms to one of the pair of connecting members.

26. The open air system according to claim 25 wherein the guide track module further comprises a lift ramp.

27. The open air system according to claim 26 wherein the guide member engages the lift ramp when the system is in an open position.

* * * * *